United States Patent
Hwang et al.

(10) Patent No.: US 11,864,207 B2
(45) Date of Patent: Jan. 2, 2024

(54) METHOD AND DEVICE FOR TRANSMITTING OR RECEIVING PHYSICAL SIDELINK FEEDBACK CHANNEL IN WIRELESS COMMUNICATION SYSTEM

(71) Applicant: LG ELECTRONICS INC., Seoul (KR)

(72) Inventors: Daesung Hwang, Seoul (KR); Seungmin Lee, Seoul (KR); Hanbyul Seo, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 18/109,682

(22) Filed: Feb. 14, 2023

(65) Prior Publication Data
US 2023/0199804 A1    Jun. 22, 2023

Related U.S. Application Data

(63) Continuation of application No. PCT/KR2022/005412, filed on Apr. 14, 2022.

(30) Foreign Application Priority Data

Apr. 14, 2021 (KR) .................. 10-2021-0048710
May 4, 2021 (KR) .................. 10-2021-0058035
May 10, 2021 (KR) .................. 10-2021-0060170

(51) Int. Cl.
*H04L 5/00* (2006.01)
*H04W 72/25* (2023.01)
*H04W 72/12* (2023.01)

(52) U.S. Cl.
CPC ........... *H04W 72/25* (2023.01); *H04W 72/12* (2013.01)

(58) Field of Classification Search
CPC .... H04L 1/1854; H04L 5/0055; H04W 72/25; H04W 72/12
(Continued)

(56) References Cited

U.S. PATENT DOCUMENTS 11,178,578 B2 * 11/2021 Huang .................. H04W 28/26
2020/0228247 A1 * 7/2020 Guo ....................... H04L 1/0025
(Continued)

FOREIGN PATENT DOCUMENTS

WO    WO-2023011344 A1 * 2/2023

OTHER PUBLICATIONS

LG Electronics Inc., "Feature lead sumary for AI 8.11.1.2 Feasibility and benefits for mode 2 enhancements," 3GPP TSG-RAN WG1 #104-e, e-Meeting, R1-2102268, Mar. 2021, 71 pages.
(Continued)

*Primary Examiner* — Robert J Lopata
(74) *Attorney, Agent, or Firm* — LEE HONG DEGERMAN KANG WAIMEY

(57) ABSTRACT

A method for transmitting a physical sidelink feedback channel (PSFCH) by a first terminal in a wireless communication system according to an embodiment of the present specification comprises the steps of receiving configuration information related to the PSFCH from a second terminal; receiving a physical sidelink control channel (PSCCH) from the second terminal, wherein the PSCCH is related to scheduling of a physical sidelink shared channel (PSSCH); and transmitting the PSFCH to the second terminal. The PSFCH is transmitted in a slot on the basis of the PSFCH including collision information. The slot is determined on the basis of the number of preconfigured slots and a resource reserved on the basis of sidelink control information (SCI) related to the PSCCH.

11 Claims, 17 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2022/0240265 | A1* | 7/2022 | Sarkis | H04L 5/0037 |
| 2022/0303954 | A1* | 9/2022 | Hwang | H04W 72/20 |
| 2022/0312457 | A1* | 9/2022 | Wang | H04W 72/1263 |
| 2022/0321278 | A1* | 10/2022 | Yoshioka | H04L 1/1854 |
| 2022/0322302 | A1* | 10/2022 | Park | H04W 72/20 |
| 2022/0337348 | A1* | 10/2022 | Hahn | H04L 1/1896 |
| 2022/0360389 | A1* | 11/2022 | Luo | H04L 5/0007 |
| 2023/0018162 | A1* | 1/2023 | Balasubramanian | G01S 5/0268 |
| 2023/0050839 | A1* | 2/2023 | Lee | H04L 1/1812 |
| 2023/0057836 | A1* | 2/2023 | Yeo | H04L 1/1887 |
| 2023/0082690 | A1* | 3/2023 | Yoshioka | H04L 1/1861 370/329 |
| 2023/0082756 | A1* | 3/2023 | Yoshioka | H04W 72/0446 |
| 2023/0136864 | A1* | 5/2023 | Lei | H04L 1/1854 370/329 |

OTHER PUBLICATIONS

NTT Docomo, Inc., "Resource allocation for reliability and latency enhancements," 3GPP TSG-RAN WG1 #104-bis-e, e-Meeting, R1-2103593, Apr. 2021, 10 pages.

Panasonic, "Inter-UE coordination for Mode 2 enhancements," 3GPP TSG-RAN WG1 #104b-e, e-Meeting, R1-2103605, Apr. 2021, 10 pages.

PCT International Application Number PCT/KR2022/005412, International Searching Report dated Jul. 19, 2022, 4 pages.

* cited by examiner

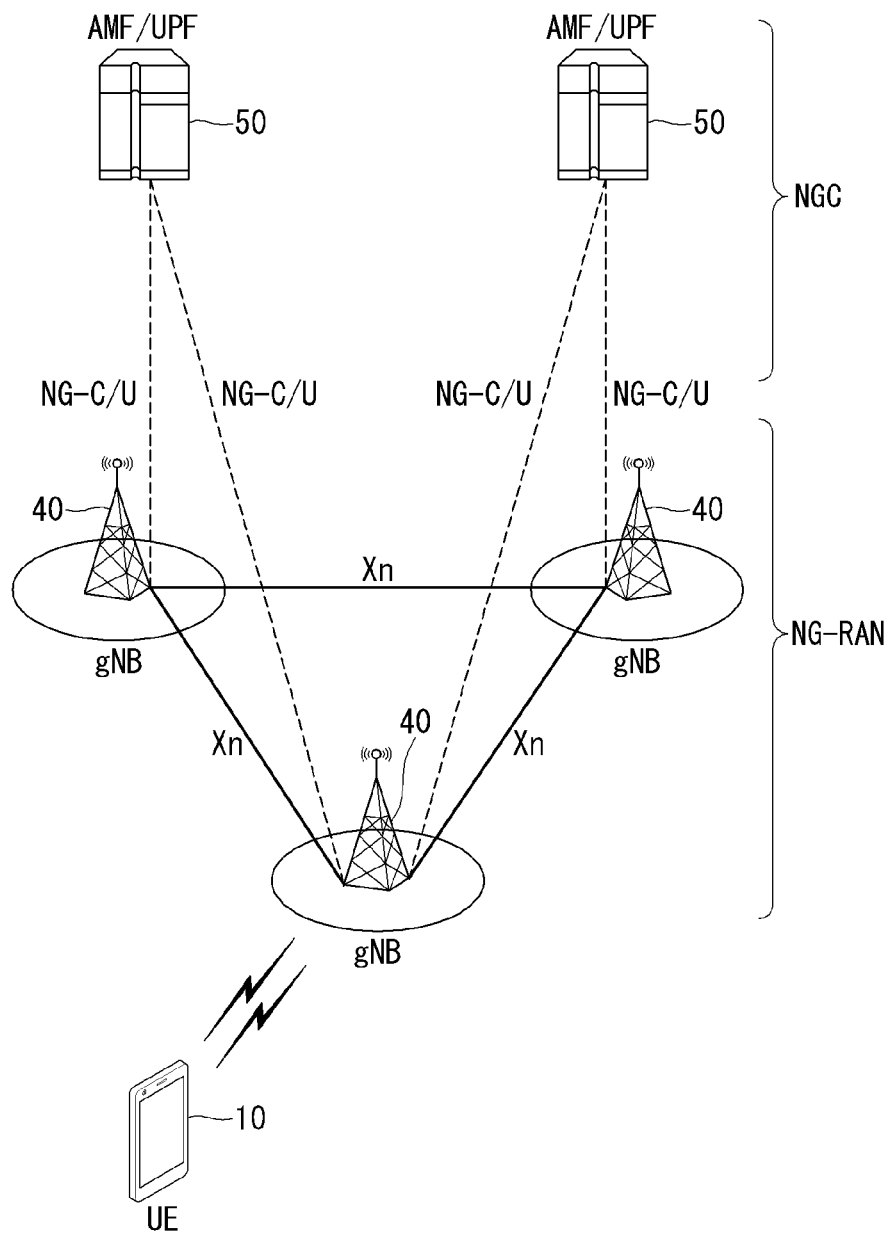
【FIG. 1】

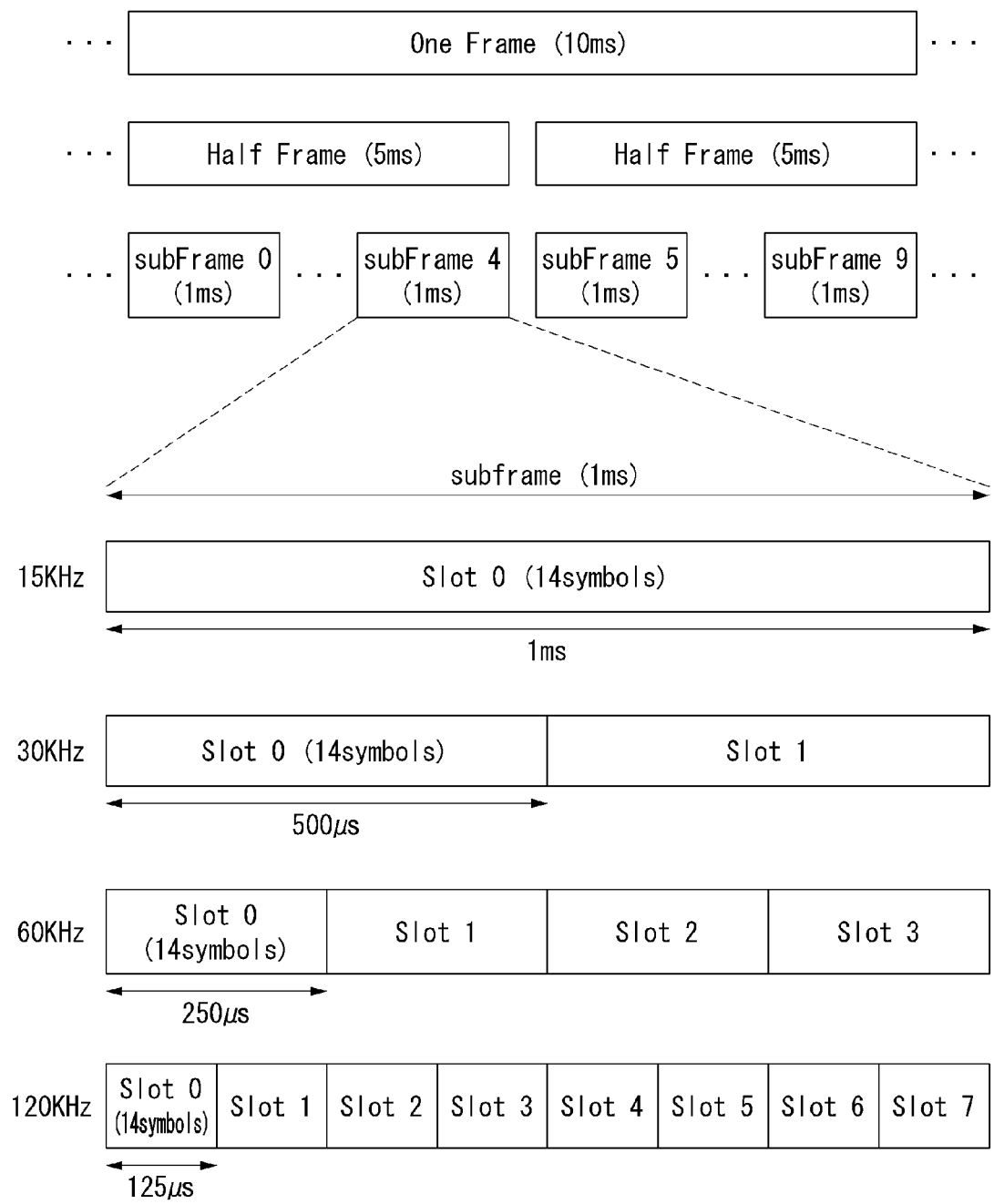
[FIG. 2]

[FIG. 3]
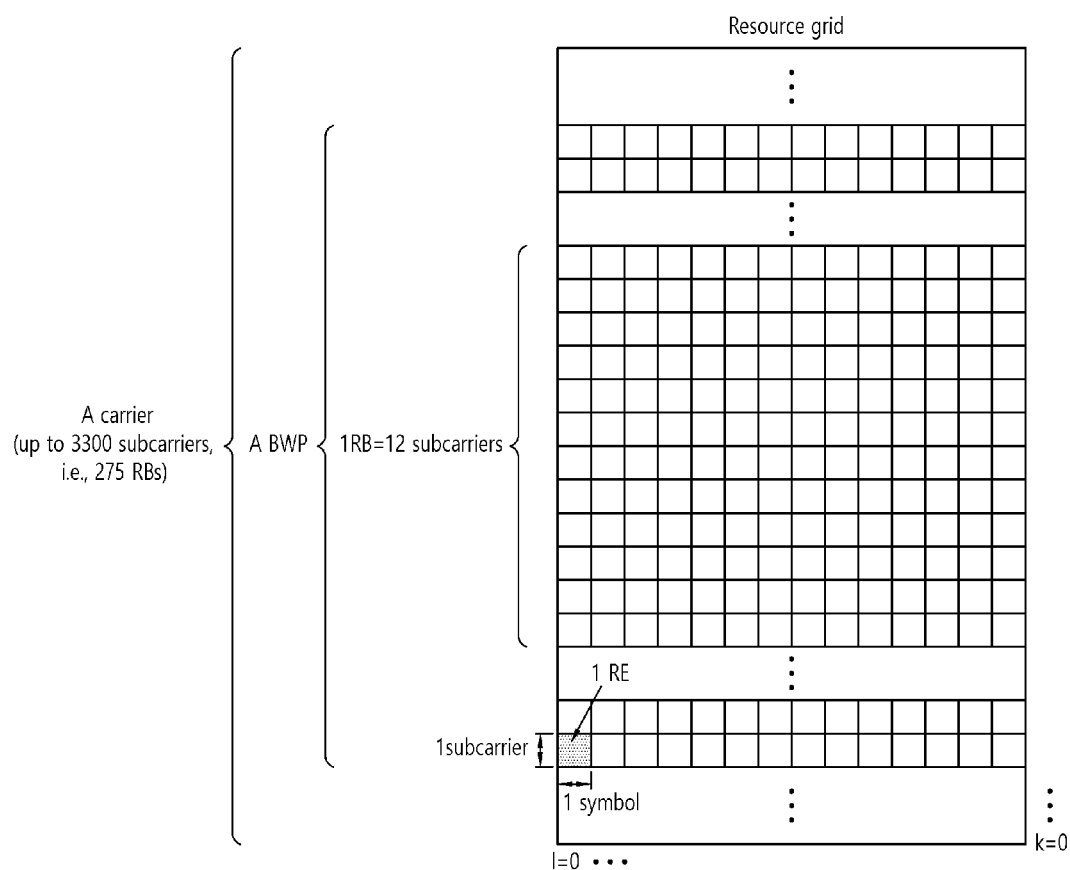

[FIG. 4]
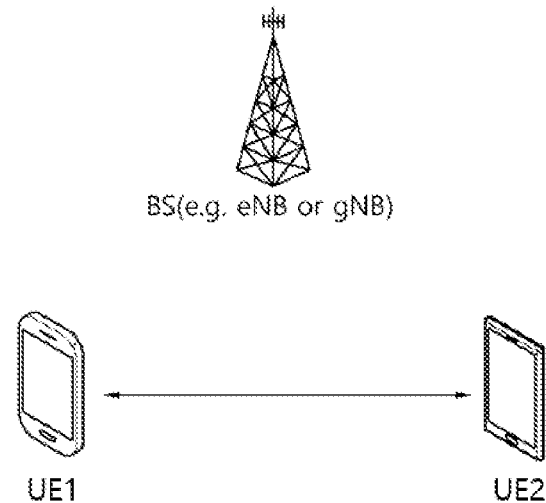
[FIG. 5]
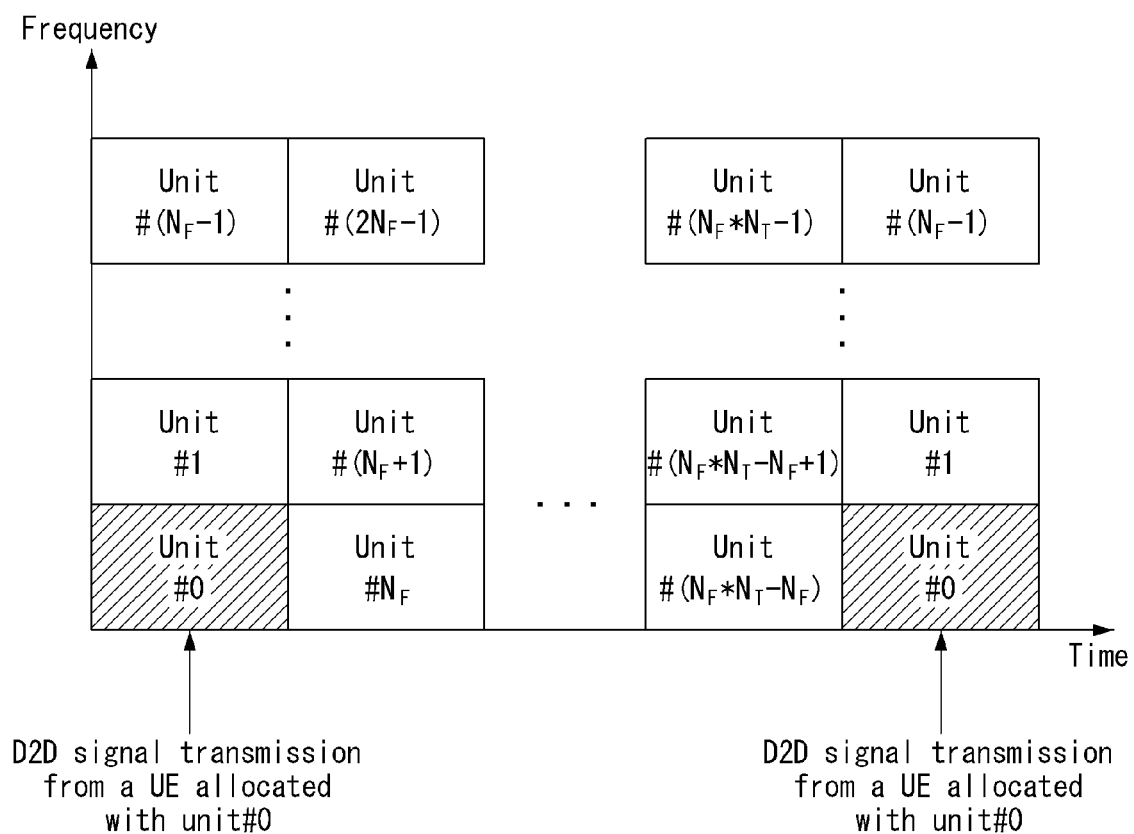

[FIG. 6]
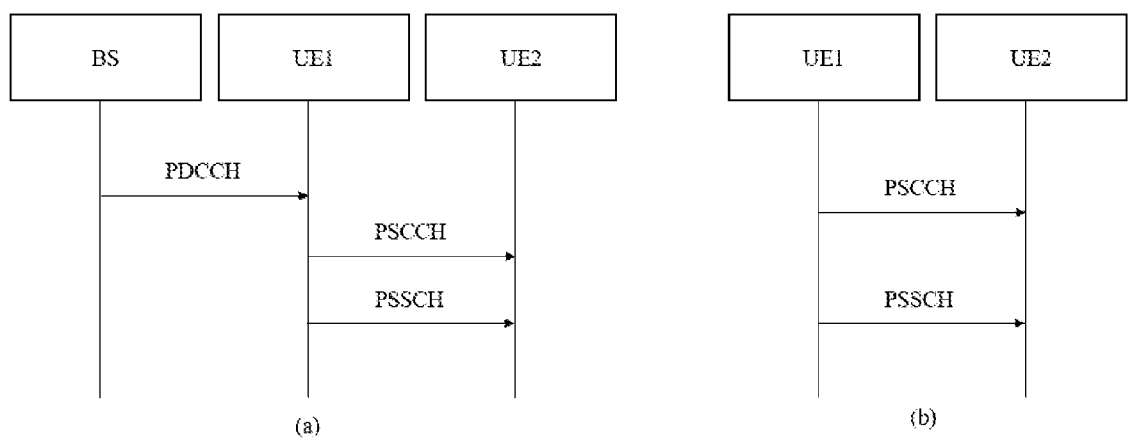
[FIG. 7]
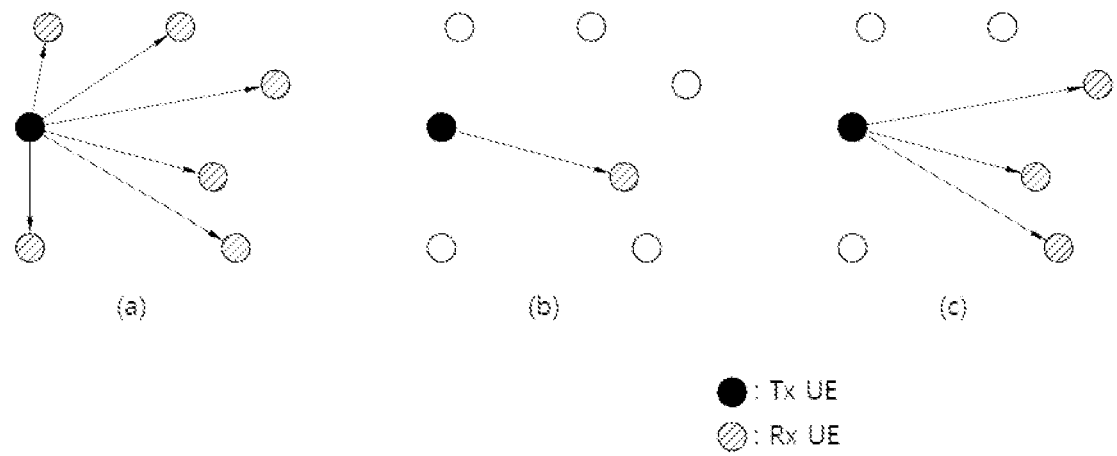

[FIG. 8]
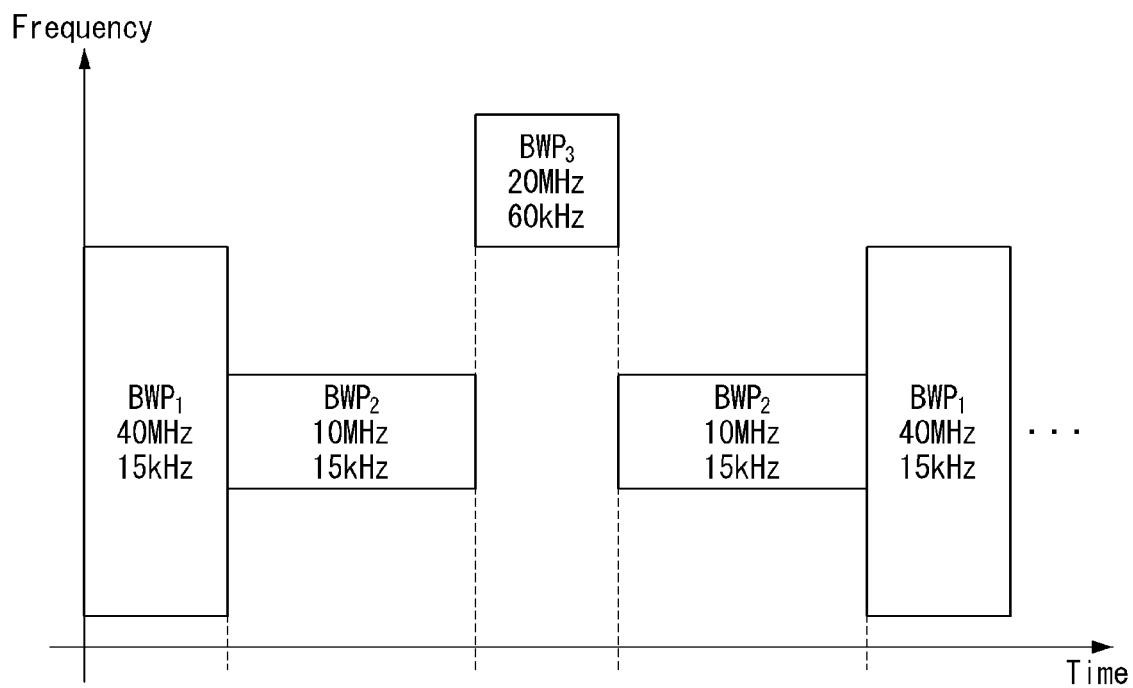

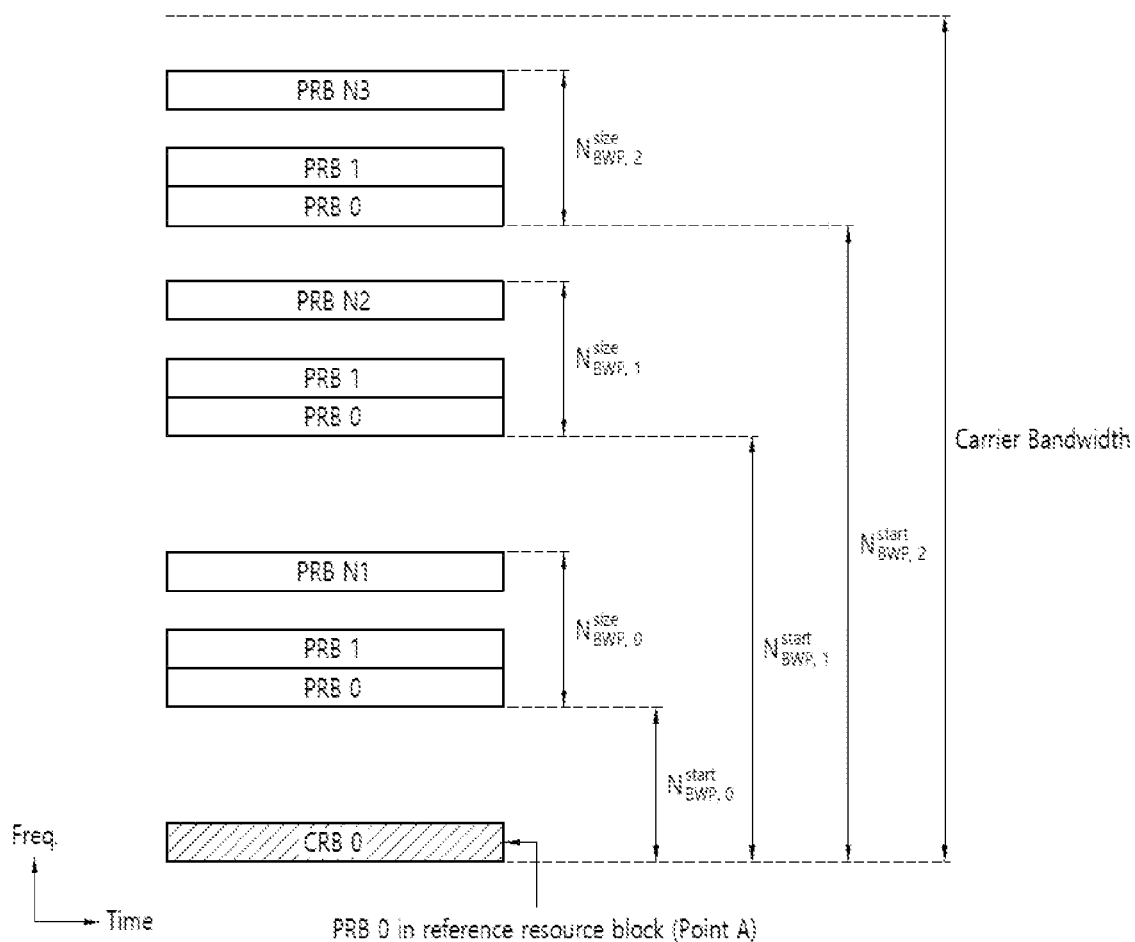
[FIG. 9]

[FIG. 10]
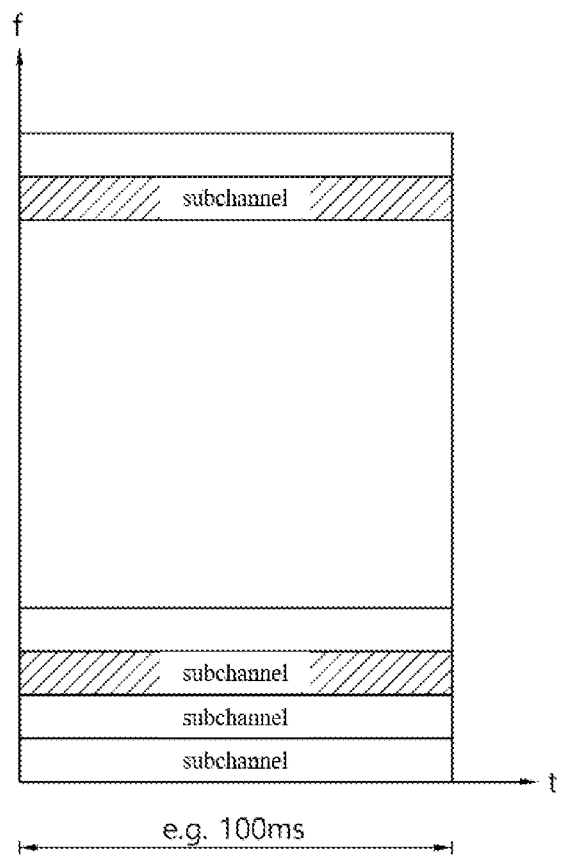

[FIG. 11]
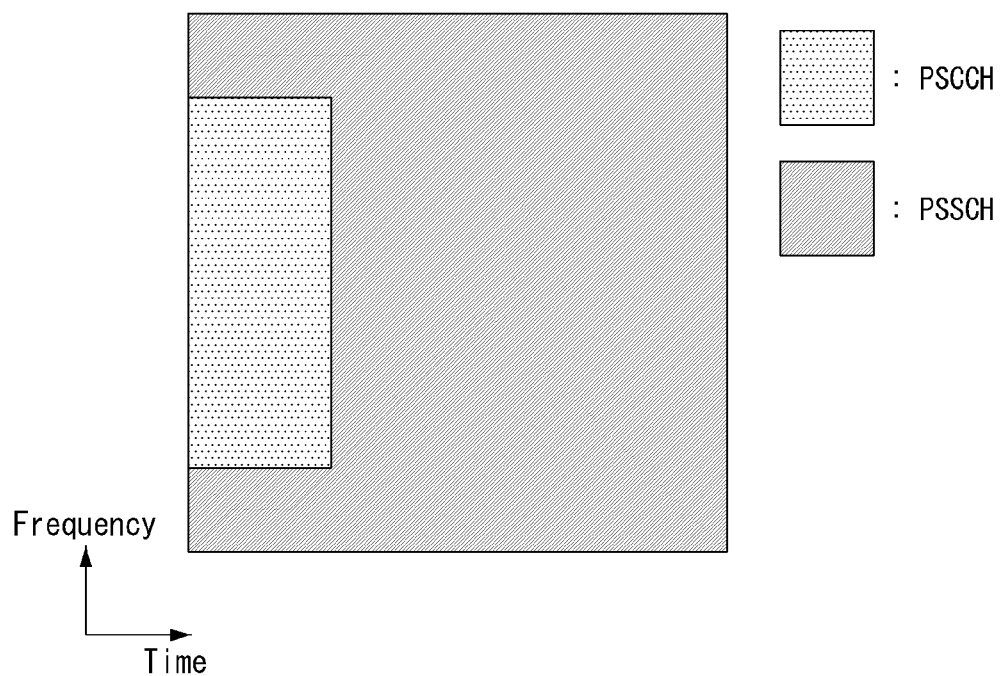
[FIG. 12]
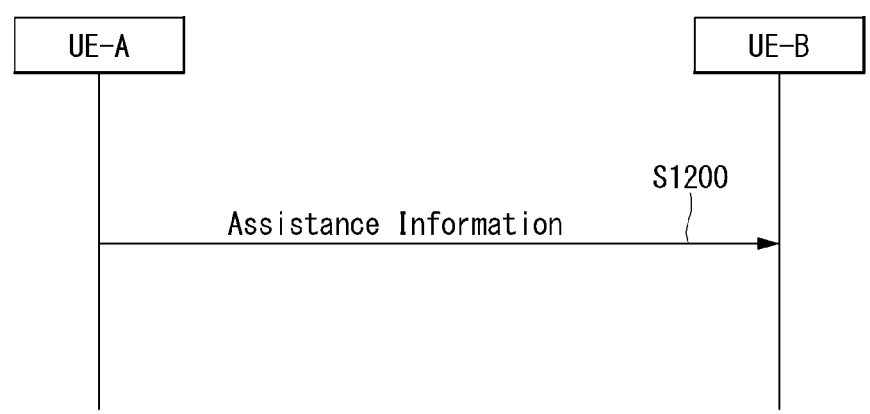

[FIG. 13]
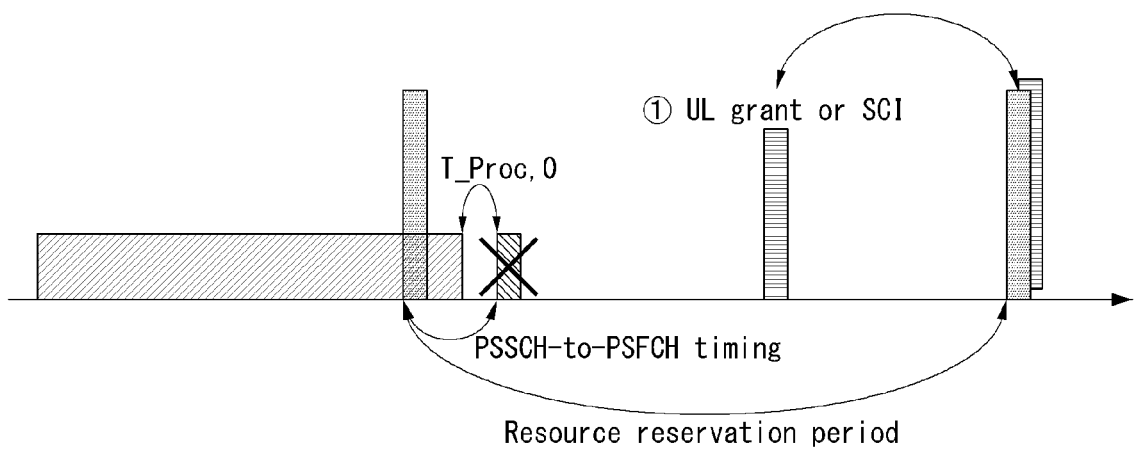

[FIG. 14]
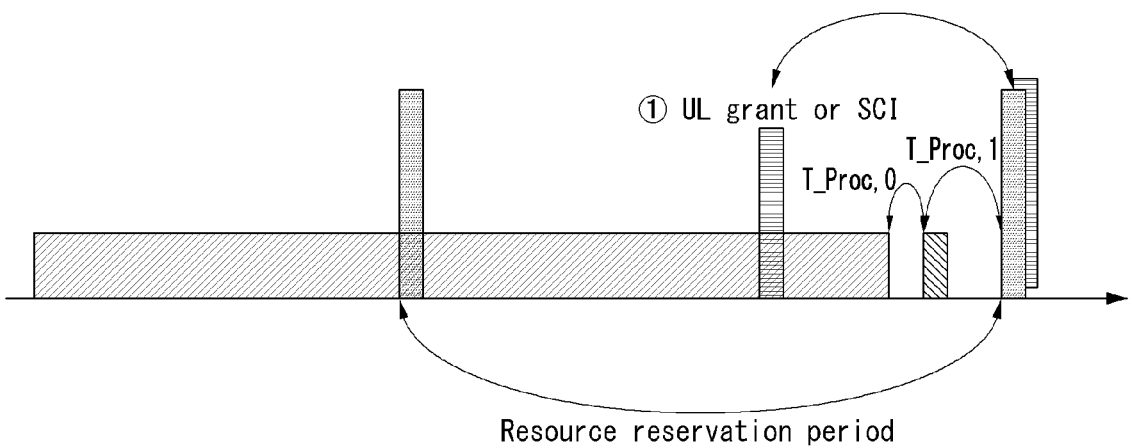

【FIG. 15】
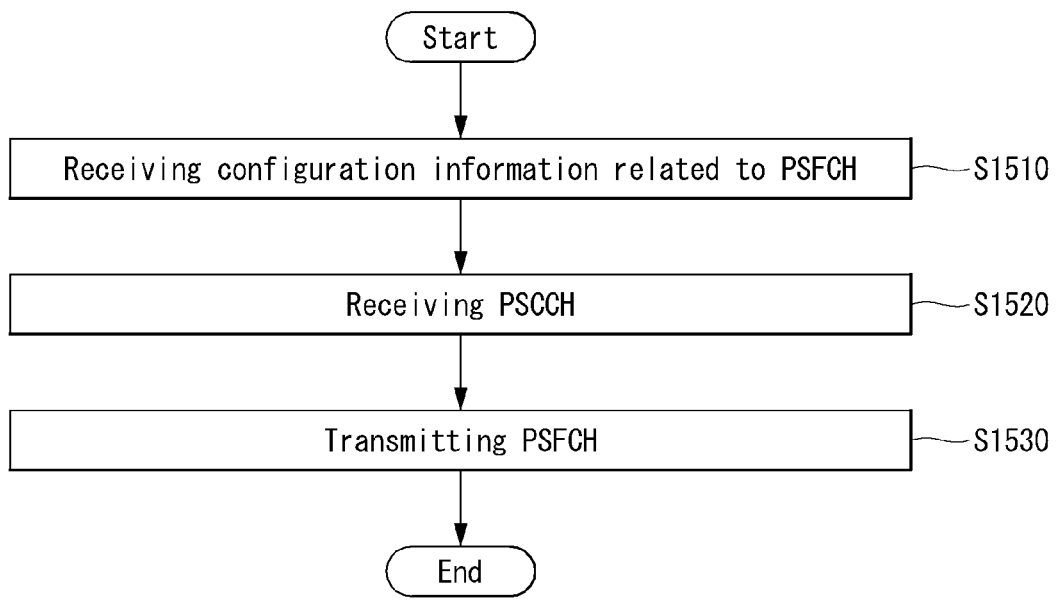
【FIG. 16】
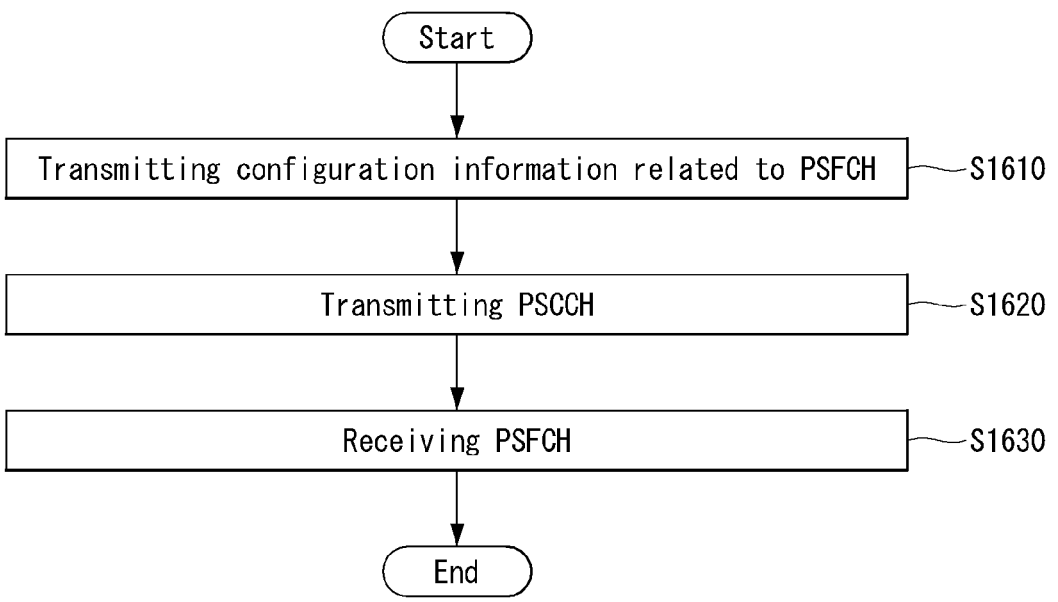

[FIG. 17]
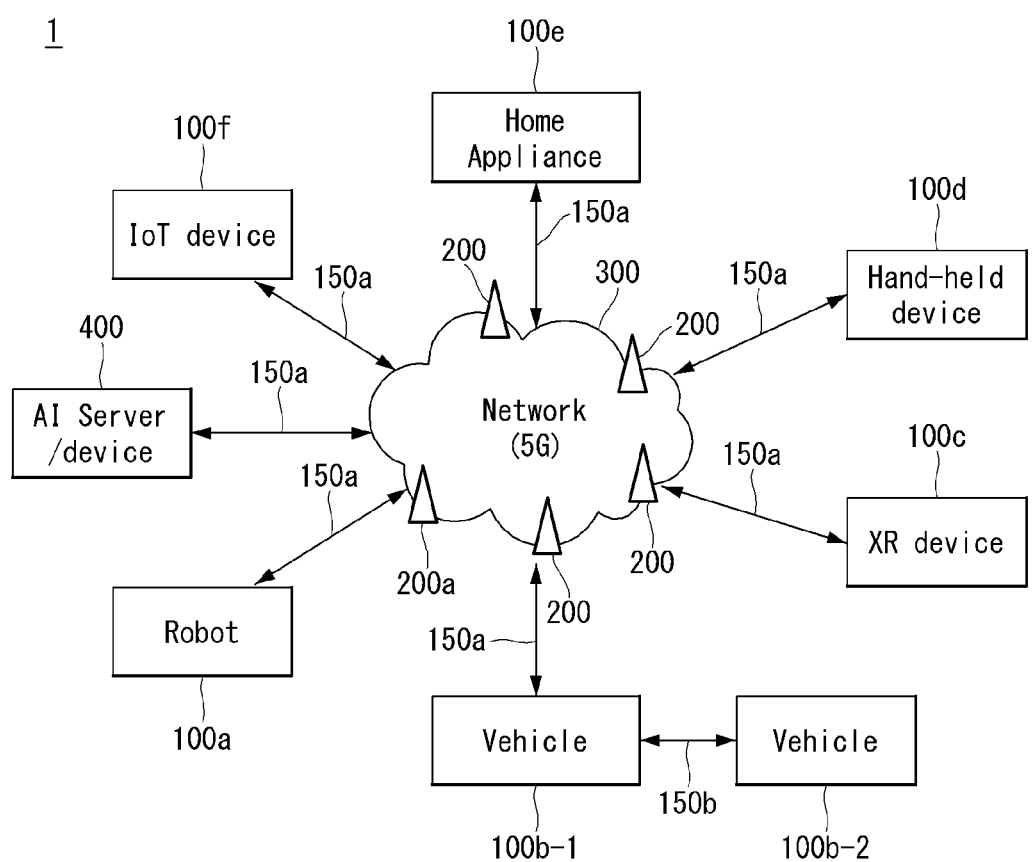

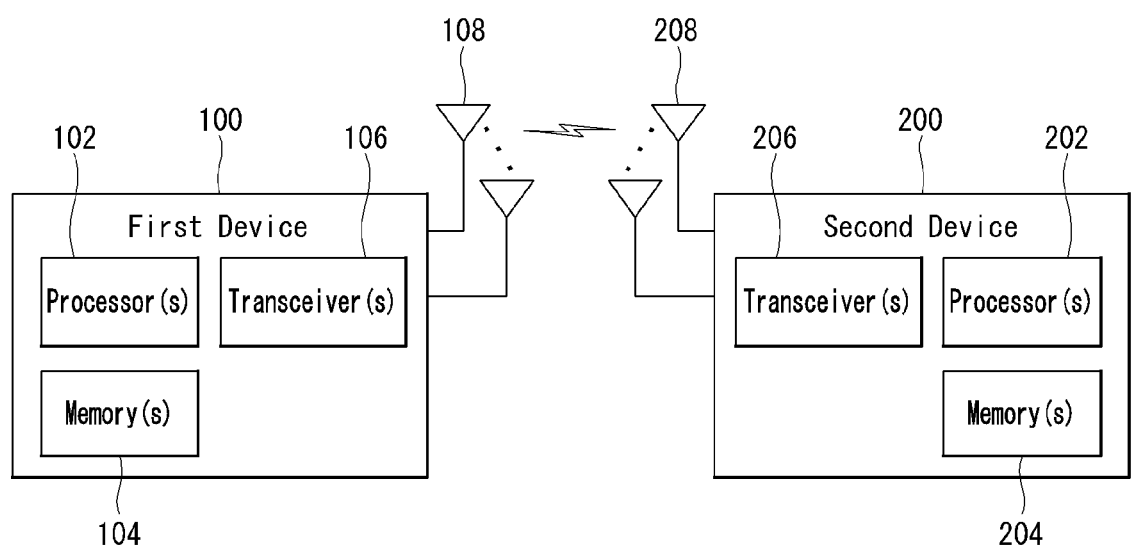
[FIG. 18]

【FIG. 19】
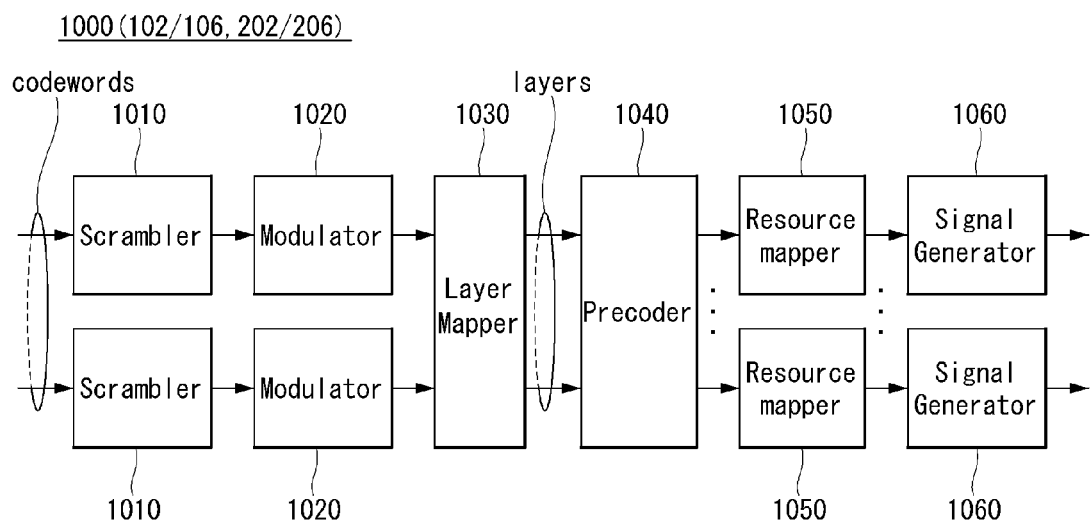
【FIG. 20】
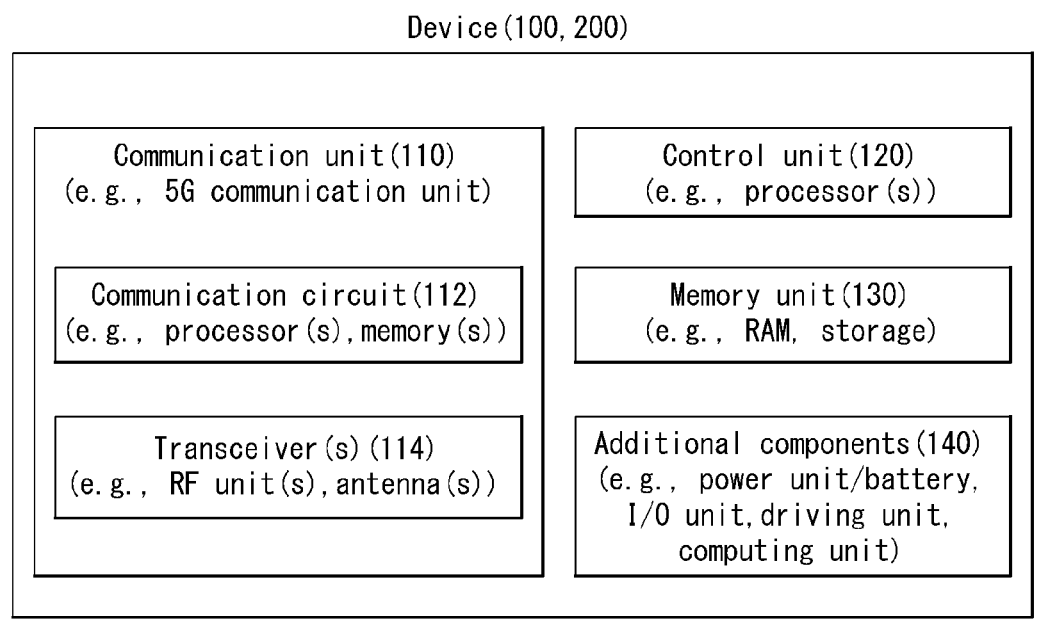

[FIG. 21]
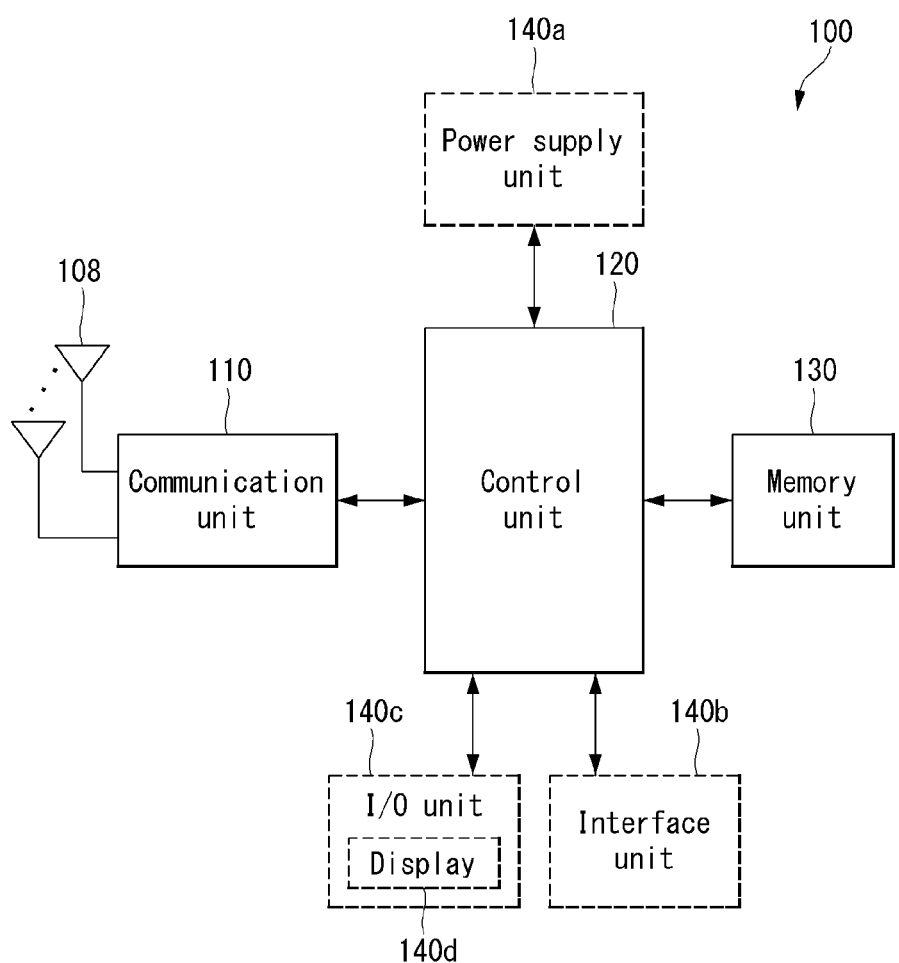

[FIG. 22]
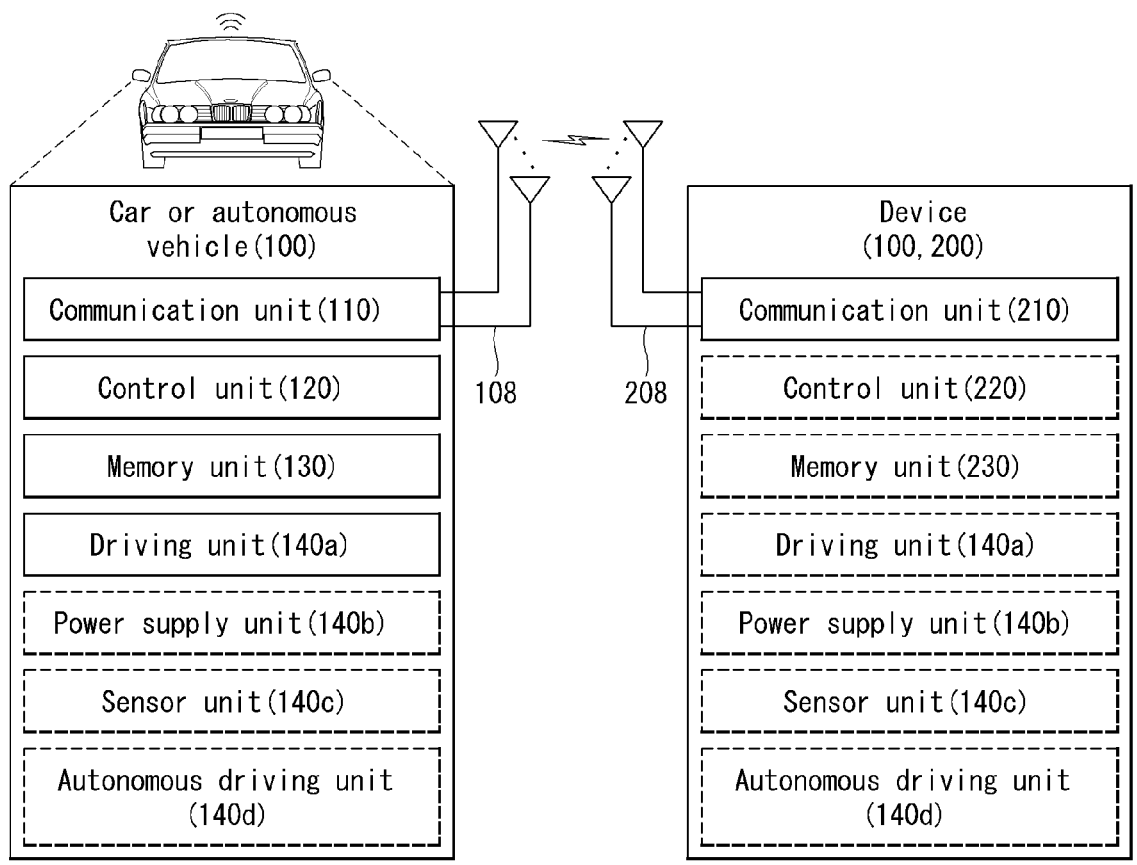

METHOD AND DEVICE FOR TRANSMITTING OR RECEIVING PHYSICAL SIDELINK FEEDBACK CHANNEL IN WIRELESS COMMUNICATION SYSTEM

CROSS-REFERENCE TO RELATED APPLICATIONS

This application is a continuation of International Application No. PCT/KR2022/005412 filed on Feb. 14, 2022, which claims the benefit of earlier filing date and right of priority to Korean Patent Application Nos. 10-2021-0048710, filed on Apr. 14, 2021, 10-2021-0058035, filed on May 4, 2021, and 10-2021-0060170, filed on May 10, 2021, the contents of which are hereby incorporated by reference herein in their entireties.

TECHNICAL FIELD

The present disclosure relates to a method and device for transmitting and receiving a physical sidelink feedback channel in a wireless communication system.

BACKGROUND

A wireless communication system is a multiple access system that supports communication of multiple users by sharing available system resources (e.g. a bandwidth, transmission power, etc.) among them. Examples of multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

As a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

Regarding an inter-UE coordination mechanism, two schemes may be considered. In scheme 1, a UE-A may provide a UE-B with a set of resources that can be used for a resource (re)selection procedure of the UE-B. In scheme 2, a UE-A may provide a UE-B with resource collision related information for resources indicated by sidelink control information (SCI) of the UE-B. The UE-B may avoid a resource collision by reselecting some of the resources indicated by the SCI of the UE-B.

SUMMARY

A transmission time point of information related to resource conflict according to the scheme 2 may be determined from a reception time point of the SCI. However, when a difference between a time point according to a reserved resource based on the SCI and the reception time point of the SCI (that is, a distance between the reserved resource based on the SCI and the reception time point of the SCI on the time axis) is large, there arises a problem in which other conflict factors (UL grant or other SCI) occurring within the corresponding time interval (that is, the time interval from the SCI reception time point to the reserved resource based on the SCI) cannot be considered.

An object of the present disclosure is to propose a method for solving the above problems.

Objects of the present disclosure are not limited to the foregoing, and other unmentioned objects would be apparent to one of ordinary skill in the art from the following description.

A method of a first User Equipment (UE) for transmitting a Physical Sidelink Feedback Channel (PSFCH) in a wireless communication system according to an embodiment of the present disclosure, the method comprises receiving, from a second UE, configuration information related to the PSFCH, receiving, from the second UE, a Physical Sidelink Control Channel (PSCCH), wherein the PSCCH is related to scheduling of a Physical Sidelink Shared Channel (PSSCH) and transmitting, to the second UE, the PSFCH.

The PSFCH includes i) HARQ-ACK information related to a reception of the PSSCH or ii) conflict information related to a reception of the PSSCH.

Based on the PSFCH including the conflict information, the PSFCH is transmitted in a slot. The slot is determined based on a reserved resource based on Sidelink Control Information (SCI) related to the PSCCH and a preset number of slots.

The slot may be based on a slot which is before the reserved resource based on the SCI, and the preset number of slots may represent a minimum interval between the reserved resource based on the SCI and the slot.

The slot may include a slot after slots determined based on a preset value from a slot on which the SCI is received. The preset value may be a value configured as a minimum interval between a slot for receiving the PSSCH and a slot for transmitting the PSFCH related to the HARQ-ACK information.

The conflict information may be based on information obtained at a time point earlier than the slots determined based on the preset value.

The preset number of slots may be determined based on a value configured for checking whether a sidelink resource is preempted.

The preset number of slots may be determined based on a processing time configured for selection of a sidelink resource.

Based on the PSFCH including the conflict information, a priority related to a reception of the PSFCH by the second UE may be determined based on a priority related to the reserved resource based on the SCI.

The PSFCH related to the conflict information may be transmitted based on inability to receive the PSSCH in the reserved resource based on the SCI due to half-duplex operation of the first UE. The half-duplex operation of the first UE may include a transmission operation or a reception operation of the first UE.

The PSFCH related to the conflict information may be transmitted based on overlapping of the reserved resource based on the SCI with a reserved resource based on SCI of a third UE. The third UE may be different from the second UE.

A first user equipment (UE) transmitting a Physical Sidelink Feedback Channel (PSFCH) in a wireless communication system according to another embodiment of the present disclosure, the first UE comprises one or more transceivers, one or more processors controlling the one or more transceivers, and one or more memories operably connected to the one or more processors.

The one or more memories store instructions for performing operations based on being executed by the one or more processors.

The operations includes receiving, from a second UE, configuration information related to the PSFCH, receiving, from the second UE, a Physical Sidelink Control Channel (PSCCH), wherein the PSCCH is related to scheduling of a Physical Sidelink Shared Channel (PSSCH) and transmitting, to the second UE, the PSFCH.

The PSFCH includes i) HARQ-ACK information related to a reception of the PSSCH or ii) conflict information related to a reception of the PSSCH.

Based on the PSFCH including the conflict information, the PSFCH is transmitted in a slot. The slot is determined based on a reserved resource based on Sidelink Control Information (SCI) related to the PSCCH and a preset number of slots.

A device for controlling a first user equipment (UE) to transmit a Physical Sidelink Feedback Channel (PSFCH) in a wireless communication system according to another embodiment of the present disclosure, the device comprises one or more processors and one or more memories operably connected to the one or more processors.

The one or more memories store instructions for performing operations based on being executed by the one or more processors.

The operations include receiving, from a second UE, configuration information related to the PSFCH, receiving, from the second UE, a Physical Sidelink Control Channel (PSCCH), wherein the PSCCH is related to scheduling of a Physical Sidelink Shared Channel (PSSCH) and transmitting, to the second UE, the PSFCH.

The PSFCH includes i) HARQ-ACK information related to a reception of the PSSCH or ii) conflict information related to a reception of the PSSCH.

Based on the PSFCH including the conflict information, the PSFCH is transmitted in a slot. The slot is determined based on a reserved resource based on Sidelink Control Information (SCI) related to the PSCCH and a preset number of slots.

One or more non-transitory computer-readable medium according to another embodiment of the present disclosure stores one or more instructions.

The one or more instructions perform operations based on being executed by one or more processors.

The operations include receiving, from a second UE, configuration information related to the PSFCH, receiving, from the second UE, a Physical Sidelink Control Channel (PSCCH), wherein the PSCCH is related to scheduling of a Physical Sidelink Shared Channel (PSSCH) and transmitting, to the second UE, the PSFCH.

The PSFCH includes i) HARQ-ACK information related to a reception of the PSSCH or ii) conflict information related to a reception of the PSSCH.

Based on the PSFCH including the conflict information, the PSFCH is transmitted in a slot. The slot is determined based on a reserved resource based on Sidelink Control Information (SCI) related to the PSCCH and a preset number of slots.

A method of a second User Equipment (UE) for receiving a Physical Sidelink Feedback Channel (PSFCH) in a wireless communication system according to another embodiment of the present disclosure, the method comprises transmitting, to a first UE, configuration information related to the PSFCH, transmitting, to the first UE, a Physical Sidelink Control Channel (PSCCH), wherein the PSCCH is related to scheduling of a Physical Sidelink Shared Channel (PSSCH) and receiving, from the first UE, the PSFCH.

The PSFCH includes i) HARQ-ACK information related to a reception of the PSSCH by the first UE or ii) conflict information related to a reception of the PSSCH by the first UE.

Based on the PSFCH including the conflict information, the PSFCH is received in a slot. The slot is determined based on a reserved resource based on Sidelink Control Information (SCI) related to the PSCCH and a preset number of slots.

A second user equipment (UE) receiving a Physical Sidelink Feedback Channel (PSFCH) in a wireless communication system according to another embodiment of the present disclosure, the second UE comprises one or more transceivers, one or more processors controlling the one or more transceivers, and one or more memories operably connected to the one or more processors.

The one or more memories store instructions for performing operations based on being executed by the one or more processors.

The operations include transmitting, to a first UE, configuration information related to the PSFCH, transmitting, to the first UE, a Physical Sidelink Control Channel (PSCCH), wherein the PSCCH is related to scheduling of a Physical Sidelink Shared Channel (PSSCH) and receiving, from the first UE, the PSFCH.

The PSFCH includes i) HARQ-ACK information related to a reception of the PSSCH by the first UE or ii) conflict information related to a reception of the PSSCH by the first UE.

Based on the PSFCH including the conflict information, the PSFCH is received in a slot. The slot is determined based on a reserved resource based on Sidelink Control Information (SCI) related to the PSCCH and a preset number of slots.

According to an embodiment of the present disclosure, conflict-related information representing a conflict of a reserved resource based on SCI is transmitted through a Physical Sidelink Feedback Channel (PSFCH). The PSFCH is transmitted in a slot determined based on the reserved resource based on the SCI and a preset number of slots. That is, the UE transmits the PSFCH after determining whether or not there is a resource conflict until a certain time point when the reserved resource based on the SCI arrives.

Therefore, the conflict information feedback effect can be improved compared to the case where the PSFCH transmission timing is determined based on the SCI reception time point. By extending the range (time interval) for determining whether a resource conflict occurs, the effect of preventing resource conflict through PSFCH transmission can be further improved.

Effects of the present disclosure are not limited to the foregoing, and other unmentioned effects would be apparent to one of ordinary skill in the art from the following description.

BRIEF DESCRIPTION OF THE DRAWINGS

The accompanying drawings, which are included to provide a further understanding of the present disclosure and constitute a part of the detailed description, illustrate embodiments of the present disclosure and together with the description serve to explain the principle of the present disclosure.

FIG. 1 shows a structure of an NR system, based on an embodiment of the present disclosure.

FIG. 2 shows a structure of a radio frame of an NR, based on an embodiment of the present disclosure.

FIG. 3 shows a structure of a slot of an NR frame, based on an embodiment of the present disclosure.

FIG. 4 shows a UE performing V2X or SL communication based on an embodiment of the present disclosure.

FIG. 5 shows a resource unit for V2X or SL communication based on an embodiment of the present disclosure.

FIG. 6 shows a procedure of performing V2X or SL communication by a UE based on a transmission mode, based on an embodiment of the present disclosure.

FIG. 7 shows three cast type based on an embodiment of the present disclosure.

FIG. 8 shows a plurality of BWPs based on an embodiment of the present disclosure.

FIG. 9 shows a BWP based on an embodiment of the present disclosure.

FIG. 10 shows a resource unit for CBR measurement based on an embodiment of the present disclosure.

FIG. 11 illustrates a resource pool related to CBR measurement.

FIG. 12 illustrates a procedure in which a UE-A transmits assistance information to a UE-B based on an embodiment of the present disclosure.

FIG. 13 is a diagram for explaining an example of a monitoring region according to a transmission time point of PSFCH related to conflict information.

FIG. 14 is a diagram for explaining another example of a monitoring region according to a transmission time point of PSFCH related to conflict information.

FIG. 15 is a flowchart for explaining a method of a first User Equipment (UE) for transmitting a physical sidelink feedback channel (PSFCH) in a wireless communication system according to an embodiment of the present disclosure.

FIG. 16 is a flowchart for explaining a method of a second User Equipment (UE) for receiving a physical sidelink feedback channel (PSFCH) in a wireless communication system according to another embodiment of the present disclosure.

FIG. 17 shows a communication system 1 based on an embodiment of the present disclosure.

FIG. 18 shows wireless devices based on an embodiment of the present disclosure.

FIG. 19 shows a signal process circuit for a transmission signal based on an embodiment of the present disclosure.

FIG. 20 shows another example of a wireless device based on an embodiment of the present disclosure.

FIG. 21 shows a hand-held device based on an embodiment of the present disclosure FIG. 22 shows a vehicle or an autonomous vehicle based on an embodiment of the present disclosure.

DETAILED DESCRIPTION

In various embodiments of the present disclosure, "/"and"," should be interpreted as representing "and/or". For example, "A/B" may mean "A and/or B". Furthermore, "A, B" may mean "A and/or B". Furthermore, "A/B/C" may mean "at least one of A, B, and/or C". Furthermore, "A, B, C" may mean "at least one of A, B, and/or C".

In various embodiments of the present disclosure, "or" should be interpreted as representing "and/or". For example, "A or B" may include "only A", "only B", and/or "both A and B". In other words, "or" should be interpreted as representing "additionally" or "alternatively".

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features based on an embodiment of the present disclosure will not be limited only to this.

Layers of a radio interface protocol between the UE and the network may be classified into a first layer (L1), a second layer (L2), and a third layer (L3) based on the lower three layers of an open system interconnection (OSI) model, which is well-known in the communication system. Herein, a physical layer belonging to the first layer provides a physical channel using an Information Transfer Service, and a Radio Resource Control (RRC) layer, which is located in the third layer, executes a function of controlling radio resources between the UE and the network. For this, the RRC layer exchanges RRC messages between the UE and the base station.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

The radio resource control (RRC) layer is defined only in a control plane. And, the RRC layer performs a function of controlling logical channel, transport channels, and physical channels in relation with configuration, re-configuration, and release of radio bearers. The RB refers to a logical path being provided by the first layer (physical layer or PHY layer) and the second layer (MAC layer, RLC layer, Packet Data Convergence Protocol (PDCP) layer) in order to transport data between the UE and the network.

Functions of a PDCP layer in the user plane include transfer, header compression, and ciphering of user data. Functions of a PDCP layer in the control plane include transfer and ciphering/integrity protection of control plane data.

The configuration of the RB refers to a process for specifying a radio protocol layer and channel properties in order to provide a particular service and for determining respective detailed parameters and operation methods. The RB may then be classified into two types, i.e., a signaling radio bearer (SRB) and a data radio bearer (DRB). The SRB is used as a path for transmitting an RRC message in the control plane, and the DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the base station is released.

Downlink transport channels transmitting (or transporting) data from a network to a UE include a Broadcast Channel (BCH) transmitting system information and a downlink Shared Channel (SCH) transmitting other user traffic or control messages. Traffic or control messages of downlink multicast or broadcast services may be transmitted via the downlink SCH or may be transmitted via a separate downlink Multicast Channel (MCH). Uplink transport channels transmitting (or transporting) data from a UE to a network include a Random Access Channel (RACH) transmitting initial control messages and an uplink Shared Channel (SCH) transmitting other user traffic or control messages.

Logical channels existing at a higher level than the transmission channel and being mapped to the transmission channel may include a Broadcast Control Channel (BCCH), a Paging Control Channel (PCCH), a Common Control Channel (CCCH), a Multicast Control Channel (MCCH), a Multicast Traffic Channel (MTCH), and so on.

A physical channel is configured of a plurality of OFDM symbols in the time domain and a plurality of sub-carriers in the frequency domain. One subframe is configured of a plurality of OFDM symbols in the time domain. A resource block is configured of a plurality of OFDM symbols and a plurality of sub-carriers in resource allocation units. Additionally, each subframe may use specific sub-carriers of specific OFDM symbols (e.g., first OFDM symbol) of the corresponding subframe for a Physical Downlink Control Channel (PDCCH), i.e., L1/L2 control channels. A Transmission Time Interval (TTI) refers to a unit time of a subframe transmission.

FIG. 1 shows a structure of an NR system, based on an embodiment of the present disclosure.

Referring to FIG. 1, a Next Generation-Radio Access Network (NG-RAN) may include a next generation-Node B (gNB) and/or eNB providing a user plane and control plane protocol termination to a user. FIG. 1 shows a case where the NG-RAN includes only the gNB. The gNB and the eNB are connected to one another via Xn interface. The gNB and the eNB are connected to one another via 5th Generation (5G) Core Network (5GC) and NG interface. More specifically, the gNB and the eNB are connected to an access and mobility management function (AMF) via NG-C interface, and the gNB and the eNB are connected to a user plane function (UPF) via NG-U interface.

FIG. 2 shows a structure of a radio frame of an NR, based on an embodiment of the present disclosure.

Referring to FIG. 2, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols based on a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot (Nslotsymb), a number slots per frame (Nframe,uslot), and a number of slots per subframe (Nsubframe,uslot) based on an SCS configuration (u), in a case where a normal CP is used.

TABLE 1

| SCS ($15 * 2^u$) | $N_{symb}^{slot}$ | $N_{slot}^{frame,u}$ | $N_{slot}^{subframe,u}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS (15 * $2^u$) | $N_{symb}^{slot}$ | $N_{slot}^{frame,u}$ | $N_{slot}^{subframe,u}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range Designation | Corresponding Frequency Range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range Designation | Corresponding Frequency Range | Subcarrier Spacing (SCS) |
|---|---|---|
| FR1 | 410 MHz-7125 MHz | 15, 30, 60 kHz |
| FR2 | 24250 MHz-52600 MHZ | 60, 120, 240 kHz |

FIG. 3 shows a structure of a slot of an NR frame, based on an embodiment of the present disclosure.

Referring to FIG. 3, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

A radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Sidelink Synchronization Signal (SLSS) and Synchronization Information

The SLSS may be an SL-specific sequence and include a primary sidelink synchronization signal (PSSS) and a secondary sidelink synchronization signal (SSSS). The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and/or for synchronization acquisition. For example, the UE may use the S-PSS and the S-SSS for acquisition of fine synchronization and/or for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

A plurality of numerologies having different SCSs and/or CP lengths may be supported in an NR SL system. In this case, a length of a time resource used by a transmitting UE to transmit the S-SSB may be decreased along with an increase in the SCS. Accordingly, coverage of the S-SSB may be decreased. Therefore, in order to ensure the coverage of the S-SSB, the transmitting UE may transmit one or more S-SSBs to a receiving UE within one S-SSB transmission period based on the SCS. For example, the number of S-SSBs transmitted by the transmitting UE to the receiving UE within one S-SSB transmission period may be pre-configured or configured to the transmitting UE. For example, an S-SSB transmission period may be 160 ms. For example, the S-SSB transmission period of 160 ms may be supported for all SCSs.

For example, if the SCS is 15 kHz in FR1, the transmitting UE may transmit 1 or 2 S-SSBs to the receiving UE within one S-SSB transmission period. For example, if the SCS is 30 kHz in FR1, the transmitting UE may transmit 1 or 2 S-SSBs to the receiving UE within one S-SSB transmission period. For example, if the SCS is 60 kHz in FR1, the transmitting UE may transmit 1, 2, or 4 S-SSBs to the receiving UE within one S-SSB transmission period.

For example, if the SCS is 60 kHz in FR2, the transmitting UE may transmit 1, 2, 4, 8, 16, or 32 S-SSBs to the receiving UE within one S-SSB transmission period. For example, if the SCS is 120 kHz in FR2, the transmitting UE may transmit 1, 2, 4, 8, 16, 32, or 64 S-SSBs to the receiving UE within one S-SSB transmission period.

If the SCS is 60 kHz, two types of CP may be supported. In addition, a structure of an S-SSB transmitted by the transmitting UE to the receiving UE may differ depending on a CP type. For example, the CP type may be normal CP (NCP) or extended CP (ECP). Specifically, for example, if the CP type is the NCP, the number of symbols for mapping a PSBCH within an S-SSB transmitted by the transmitting UE may be 9 or 8. Otherwise, for example, if the CP type is the ECP, the number of symbols for mapping the PSBCH within the S-SSB transmitted by the transmitting UE may be 7 or 6. For example, the PSBCH may be mapped to a first/initial symbol within the S-SSB transmitted by the transmitting UE. For example, the receiving UE which receives the S-SSB may perform an automatic gain control (AGC) operation in a first/initial symbol duration of the S-SSB.

FIG. 4 shows a UE performing V2X or SL communication based on an embodiment of the present disclosure.

Referring to FIG. 4, in V2X or SL communication, the term 'UE' may generally imply a UE of a user. However, if a network equipment such as a BS transmits/receives a signal based on a communication scheme between UEs, the BS may also be regarded as a sort of the UE. For example, a UE 1 may be a first device 100, and a UE 2 may be a second device 200.

For example, the UE 1 may select a resource unit corresponding to a specific resource in a resource pool which implies a set of series of resources. In addition, the UE 1 may transmit an SL signal by using the resource unit. For example, the UE 2 which is a receiving UE may be allocated with a resource pool in which the UE 1 is capable of transmitting a signal, and may detect a signal of the UE 1 in the resource pool.

Herein, if the UE 1 is within a coverage of the BS, the BS may inform the UE 1 of the resource pool. Otherwise, if the UE 1 is out of the coverage of the BS, another UE may inform the UE 1 of the resource pool, or the UE 1 may use a pre-configured resource pool.

In general, the resource pool may be configured based on a plurality of resource units, and each UE may select at least one resource unit for SL signal transmission.

FIG. 5 shows a resource unit for V2X or SL communication based on an embodiment of the present disclosure.

Referring to FIG. 5, all frequency resources of a resource pool may be divided into NF resources, and all time resources of the resource pool may be divided into NT resources. Therefore, NF*NT resource units may be defined in the resource pool. FIG. 5 may show an example of a case where a corresponding resource pool is repeated with a period of NT subframes.

As shown in FIG. 5, one resource unit (e.g., Unit #0) may be periodically repeated. Alternatively, to obtain a diversity effect in a time or frequency domain, an index of a physical resource unit to which one logical resource unit is mapped may change to a pre-determined pattern over time. In a structure of such a resource unit, the resource pool may imply a set of resource units that can be used in transmission by a UE intending to transmit an SL signal.

The resource pool may be subdivided into several types. For example, based on content of an SL signal transmitted in each resource pool, the resource pool may be classified as follows.

(1) Scheduling assignment (SA) may be a signal including information related to a location of a resource used for transmission of an SL data channel by a transmitting UE, a modulation and coding scheme (MCS) or multiple input multiple output (MIMO) transmission scheme required for demodulation of other data channels, timing advance (TA), or the like. The SA can be transmitted by being multiplexed together with SL data on the same resource unit. In this case, an SA resource pool may imply a resource pool in which SA is transmitted by being multiplexed with SL data. The SA may also be referred to as an SL control channel.

(2) An SL data channel (physical sidelink shared channel (PSSCH)) may be a resource pool used by the transmitting UE to transmit user data. If SA is transmitted by being multiplexed together with SL data on the same resource unit, only an SL data channel of a type except for SA information may be transmitted in the resource pool for the SL data channel. In other words, resource elements (REs) used to transmit SA information on an individual resource unit in the SA resource pool may be used to transmit SL data still in the resource pool of the SL data channel. For example, the transmitting UE may transmit the PSSCH by mapping it to consecutive PRBs.

(3) A discovery channel may be a resource pool for transmitting, by the transmitting UE, information related to an ID thereof, or the like. Accordingly, the transmitting UE may allow an adjacent UE to discover the transmitting UE itself.

Even if the aforementioned SL signals have the same content, different resource pools may be used based on a transmission/reception attribute of the SL signals. For example, even the same SL data channel or discovery message may be classified again into different resource pools based on a scheme of determining SL signal transmission timing (e.g., whether it is transmitted at a reception time of a synchronization reference signal or transmitted by applying a specific timing advance at the reception time), a resource allocation scheme (e.g., whether a BS designates a transmission resource of an individual signal to an individual transmitting UE or whether the individual transmitting UE autonomously selects an individual signal transmission resource in a resource pool), a signal format (e.g., the number of symbols occupied by each SL signal or the number of subframes used in transmission of one SL signal), signal strength from the BS, transmit power strength of an SL UE, or the like.

Resource Allocation in SL

FIG. 6 shows a procedure of performing V2X or SL communication by a UE based on a transmission mode, based on an embodiment of the present disclosure. In various embodiments of the present disclosure, the transmission mode may be referred to as a mode or a resource allocation mode. Hereinafter, for convenience of explanation, in LTE, the transmission mode may be referred to as an LTE transmission mode. In NR, the transmission mode may be referred to as an NR resource allocation mode.

For example, (a) of FIG. 6 shows a UE operation related to an LTE transmission mode 1 or an LTE transmission mode 3. Alternatively, for example, (a) of FIG. 6 shows a UE operation related to an NR resource allocation mode 1. For example, the LTE transmission mode 1 may be applied to general SL communication, and the LTE transmission mode 3 may be applied to V2X communication.

For example, (b) of FIG. 6 shows a UE operation related to an LTE transmission mode 2 or an LTE transmission mode 4. Alternatively, for example, (b) of FIG. 6 shows a UE operation related to an NR resource allocation mode 2.

Referring to (a) of FIG. 6, in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 based on the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

For example, in the NR resource allocation mode 1, the UE may be provided or allocated with one or more SL transmission resources of one transport block (TB) from the BS through a dynamic grant. For example, the BS may provide the UE with resource for PSCCH and/or PSSCH transmission based on the dynamic grant. For example, a transmitting UE may report to the BS an SL hybrid automatic repeat request (HARQ) feedback received from a receiving UE. In this case, based on an indication within a PDCCH used by the BS to allocate a resource for SL transmission, a PUCCH resource and timing for reporting an SL HARQ feedback to the BS may be determined.

For example, DCI may include information related to a slot offset between DCI reception and first/initial SL transmission scheduled by the DCI. For example, a minimum gap between the DCI for scheduling the SL transmission resource and a first scheduled SL transmission resource may be not less than a processing time of a corresponding UE.

For example, in the NR resource allocation mode 1, for multiple SL transmissions, the UE may be periodically provided or allocated with a resource set from the BS through a configured grant. For example, the configured grant may include a configured grant type 1 or a configured grant type 2. For example, the UE may determine a TB to be transmitted in each of occasions indicated by a given configured grant.

For example, the BS may allocate an SL resource to the UE on the same carrier, or may allocate the SL resource to the UE on a different carrier.

For example, an NR BS may control LTE-based SL communication. For example, the NR BS may transmit NR DCI to the UE to schedule an LTE SL resource. In this case, for example, a new RNTI may be defined to scramble the NR DCI. For example, the UE may include an NR SL module and an LTE SL module.

For example, after the UE including the NR SL module and the LTE SL module receives NR SL DCI from a gNB, the NR SL module may convert the NR SL DCI to an LTE DCI type 5A, and the NR SL module may transfer the LTE DCI type 5A to the LTE SL module in unit of X ms. For example, after the LTE SL module receives the LTE DCI format 5A from the NR SL module, the LTE SL module may apply activation and/or release in a first/initial LTE subframe after Z ms. For example, the X may be dynamically indicated by using a field of DCI. For example, a minimum value of the X may differ depending on UE capability. For example, the UE may report a single value depending on the UE capability. For example, the X may be a positive number.

Referring to (b) of FIG. 6, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selection window by performing a sensing and resource (re)selection procedure. For example, the sensing may be performed in unit of sub-channels. In addition, the UE 1 which has autonomously selected the resource within the resource pool may transmit the SCI to the UE 2 through a PSCCH, and thereafter may transmit data based on the SCI to the UE 2 through a PSSCH.

A re-evaluation operation may be performed for the resource (re)selection. Immediately before performing a transfer on a reserved resource, the corresponding UE re-evaluates a set of resources, that the UE can select, in order to check whether a transmission intended by the UE is still suitable. Based on the sensing result, the re-evaluation may be performed on a slot based on a preset value T3. For example, the re-evaluation operation may be performed in a previous slot (e.g., m-T3) of a slot(m) in which SCI representing the reserved resource(s) is first signaled.

The preset value T3 may be related to pre-emption and/or re-evaluation for SL resource. Specifically, the UE may perform an operation related to pre-emption and/or re-evaluation based on Table 5 below.

TABLE 5

A resource(s) of the selected sidelink grant for a MAC PDU to transmit from multiplexing and assembly entity is re-evaluated by physical layer at $T_3$ before the slot where the SCI indicating the resource(s) is signalled at first time as specified in clause 8.1.4 of TS 38.214 [7].
A resource(s) of the selected sidelink grant which has been indicated by a prior SCI for a MAC PDU to transmit from multiplexing and assembly entity could be checked for pre-emption by physical layer at $T_3$ before the slot where the resource(s) is located as specified in clause 8.1.4 of TS 38.214 [7].

TABLE 5-continued

NOTE 1: It is up to UE implementation to re-evaluate or pre-empt before 'm-T$_3$' or after 'm-T$_3$' but before 'm'. For re-evaluation, m is the slot where the SCI indicating the resource(s) is signalled at first time as specified in clause 8.1.4 of TS 38.214. For pre-emption, m is the slot where the resource(s) is located as specified in clause 8.1.4 of TS 38.214.
If the MAC entity has been configured with Sidelink resource allocation mode 2 to transmit using pool(s) of resources in a carrier as indicated in TS 38.331 [5] or TS 36.331 [21] based on sensing or random selection the MAC entity shall for each Sidelink process:
1> if a resource(s) of the selected sidelink grant which has not been identified by a prior SCI is indicated for re-evaluation by the physical layer as specified in clause 8.1.4 of TS 38.214 [7]; or
1> if any resource(s) of the selected sidelink grant which has been indicated by a prior SCI is indicated for pre-emption by the physical layer as specified in clause 8.1.4 of TS 38.214 [7]:
2> remove the resource(s) from the selected sidelink grant associated to the Sidelink process;
2> randomly select the time and frequency resource from the resources indicated by the physical layer as specified in clause 8.1.4 of TS 38.214 [7] for either the removed resource or the dropped resource, according to the amount of selected frequency resources, the selected number of HARQ retransmissions and the remaining PDB of either SL data available in the logical channel(s) by ensuring the minimum time gap between any two selected resources of the selected sidelink grant in case that PSFCH is configured for this pool of resources, and that a resource can be indicated by the time resource assignment of a SCI for a retransmission according to clause 8.3.1.1 of TS 38.212 [9];
NOTE 2: If retransmission resource(s) cannot be selected by ensuring that the resource(s) can be indicated by the time resource assignment of a prior SCI, how to select the time and frequency resources for one or more transmission opportunities from the available resources is left for UE implementation by ensuring the minimum time gap between any two selected resources in case that PSFCH is configured for this pool of resources.
2> replace the removed or dropped resource(s) by the selected resource(s) for the selected sidelink grant.
NOTE 3: It is left for UE implementation to reselect any pre-selected but not reserved resource(s) other than the resource(s) indicated for pre-emption or re-evaluation by the physical layer during reselection triggered by re-evaluation or pre-emption indicated by the physical layer.
NOTE 4: It is up to UE implementation whether to set the resource reservation interval in the re-selected resource to replace pre-empted resource.
NOTE 5: It is up to UE implementation whether to trigger resource reselection due to deprioritization as specified in clause 16.2.4 of TS 38.213 [6], clause 5.14.1.2.2 of TS 36.321 [22] and clause 5.22.1.3.1a.
NOTE 6: For the selected sidelink grant corresponds to transmissions of multiple MAC PDU, it is up to UE implementation whether to apply re-evaluation check to the resources in non-initial reservation period that have been signalled neither in the immediate last nor in the current period.

The preset value T3 may be set to the same value as a processing time (e.g., $T_{proc,1}^{SL}$) configured for the resource selection of the UE. The following Table 6 illustrates a processing time determined based on a subcarrier spacing configuration ($\mu_{SL}$) of a sidelink bandwidth (SL BWP). For example, the processing time ($T_{proc,1}^{SL}$) may be configured to determine a start point T1 of a resource selection window.

TABLE 6

| $\mu_{SL}$ | $T_{proc,1}^{SL}$ [slots] |
|---|---|
| 0 | 3 |
| 1 | 5 |
| 2 | 9 |
| 3 | 17 |

For example, the UE may assist the SL resource selection for another UE. For example, in the NR resource allocation mode 2, the UE may be provided/allocated with a configured grant for SL transmission. For example, in the NR resource allocation mode 2, the UE may schedule SL transmission of another UE. For example, in the NR resource allocation mode 2, the UE may reserve an SL resource for blind retransmission.

For example, in the NR resource allocation mode 2, the UE 1 may use the SCI to indicate a priority of SL transmission to the UE 2. For example, the UE 2 may decode the SCI, and the UE 2 may perform sensing and/or resource (re)selection on the basis of the priority. For example, the resource (re)selection procedure may include a step in which the UE 2 identifies a candidate resource in a resource selection window and a step in which the UE 2 selects a resource for (re)transmission among the identified candidate resources. For example, the resource selection window may be a time interval for selecting a resource for SL transmission by the UE. For example, after the UE 2 triggers resource (re)selection, the resource selection window may start at T1≥0, and the resource selection window may be restricted by a remaining packet delay budget of the UE 2. The T1 may be determined as a value less than or equal to the processing time (e.g., $T_{proc,1}^{SL}$ of the above Table 6) configured for the resource selection. For example, when a slot in which the resource (re)selection is triggered is n, the resource selection window may be determined as a time duration of n+T1 to n+T2. The T2 may denote the number of slots that is less than or equal to the number of slots corresponding to the remaining packet delay budget.

For example, in the step in which the UE 2 identifies the candidate resource in the resource selection window, if a specific resource is indicated by the SCI received by the UE 2 from the UE 1 and if an L1 SL RSRP threshold for the specific resource exceeds an SL RSRP threshold, the UE 2 may not determine the specific resource as the candidate resource. For example, the SL RSRP threshold may be determined based on a priority of SL transmission indicated by the SCI received by the UE 2 from the UE 1 and a priority of SL transmission on a resource selected by the UE 2.

For example, the L1 SL RSRP may be measured based on an SL demodulation reference signal (DMRS). For example, one or more PSSCH DMRS patterns may be configured or pre-configured in a time domain for each resource pool. For example, a PDSCH DMRS configuration type 1 and/or type 2 may be identical or similar to a frequency domain pattern of the PSSCH DMRS. For example, a correct DMRS pattern may be indicated by the SCI. For example, in the NR resource allocation mode 2, the transmitting UE may select a specific DMRS pattern from among configured or pre-configured DMRS patterns for the resource pool.

For example, in the NR resource allocation mode 2, the transmitting UE may perform initial transmission of a transport block (TB) without reservation, based on the sensing and resource (re)selection procedure. For example, the transmitting UE may use an SCI related to a first/initial RB to reserve an SL resource for initial transmission of a second TB, based on the sensing and resource (re)selection procedure.

For example, in the NR resource allocation mode 2, the UE may reserve a resource for feedback-based PSSCH retransmission, through signaling related to previous transmission of the same TB. For example, the maximum number of SL resources reserved by one transmission including current transmission may be 2, 3, or 4. For example, the maximum number of SL resources may be identical irrespective of whether HARQ feedback is enabled. For example, the maximum number of HARQ (re)transmissions for one TB may be restricted by a configuration or a pre-configuration. For example, the maximum number of HARQ (re)transmissions may be up to 32. For example, in the absence of the configuration or the pre-configuration, the maximum number of HARQ (re)transmissions may not be designated. For example, the configuration or the pre-configuration may be for the transmitting UE. For example, in the NR resource allocation mode 2, HARQ feedback for releasing a resource not used by the UE may be supported.

For example, in the NR resource allocation mode 2, the UE may use the SCI to indicate to another UE one or more sub-channels and/or slots used by the UE. For example, the UE may use the SCI to indicate to another UE one or more sub-channels and/or slots reserved by the UE for PSSCH (re)transmission. For example, a minimum allocation unit of an SL resource may be a slot. For example, a size of a sub-channel may be configured for the UE or may be pre-configured.

Sidelink Control Information (SCI)

Control information transmitted by a BS to a UE through a PDCCH may be referred to as downlink control information (DCI), whereas control information transmitted by the UE to another UE through a PSCCH may be referred to as SCI. For example, the UE may know in advance a start symbol of the PSCCH and/or the number of symbols of the PSCCH, before decoding the PSCCH. For example, the SCI may include SL scheduling information. For example, the UE may transmit at least one SCI to another UE to schedule the PSSCH. For example, one or more SCI formats may be defined.

For example, a transmitting UE may transmit the SCI to a receiving UE on the PSCCH. The receiving UE may decode one SCI to receive the PSSCH from the transmitting UE.

For example, the transmitting UE may transmit two consecutive SCIs (e.g., 2-stage SCI) to the receiving UE on the PSCCH and/or the PSSCH. The receiving UE may decode the two consecutive SCIs (e.g., 2-stage SCI) to receive the PSSCH from the transmitting UE. For example, if SCI configuration fields are divided into two groups in consideration of a (relatively) high SCI payload size, an SCI including a first SCI configuration field group may be referred to as a first SCI or a 1st SCI, and an SCI including a second SCI configuration field group may be referred to as a second SCI or a 2nd SCI. For example, the transmitting UE may transmit the first SCI to the receiving UE through the PSCCH. For example, the transmitting UE may transmit the second SCI to the receiving UE on the PSCCH and/or the PSSCH. For example, the second SCI may be transmitted to the receiving UE through an (independent) PSCCH, or may be transmitted in a piggyback manner together with data through the PSSCH. For example, two consecutive SCIs may also be applied to different transmissions (e.g., unicast, broadcast, or groupcast).

For example, the transmitting UE may transmit the entirety or part of information described below to the receiving UE through the SCI. Herein, for example, the transmitting UE may transmit the entirety or part of the information described below to the receiving UE through the first SCI and/or the second SCI.

- PSSCH and/or PSCCH related resource allocation information, e.g., the number/positions of time/frequency resources, resource reservation information (e.g., period), and/or
- SL CSI report request indicator or SL (L1) RSRP (and/or SL (L1) RSRQ and/or SL (L1) RSSI) report request indicator, and/or
- SL CSI transmission indicator (or SL (L1) RSRP (and/or SL (L1) RSRQ and/or SL (L1) RSSI) information transmission indicator)) (on PSSCH), and/or
- MCS information, and/or
- Transmit power information, and/or
- L1 destination ID information and/or L1 source ID information, and/or
- SL HARQ process ID information, and/or
- New data indicator (NDI) information, and/or
- Redundancy version (RV) information, and/or
- (Transmission traffic/packet related) QoS information, e.g., priority information, and/or
- SL CSI-RS transmission indicator or information on the number of (to-be-transmitted) SL CSI-RS antenna ports
- Location information of a transmitting UE or location (or distance region) information of a target receiving UE (for which SL HARQ feedback is requested), and/or
- Reference signal (e.g., DMRS, etc.) related to channel estimation and/or decoding of data to be transmitted through a PSSCH, e.g., information related to a pattern of a (time-frequency) mapping resource of DMRS, rank information, antenna port index information For example, the first SCI may include information related to channel sensing. For example, the receiving UE may decode the second SCI by using a PSSCH DMRS. A polar code used in a PDCCH may be applied to the second SCI. For example, in a resource pool, a payload size of the first SCI may be identical for unicast, groupcast, and broadcast. After decoding the first SCI, the receiving UE does not have to perform blind decoding of the second SCI. For example, the first SCI may include scheduling information of the second SCI.

In various embodiments of the present disclosure, since the transmitting UE may transmit at least one of the SCI, the first SCI, and/or the second SCI to the receiving UE through the PSCCH, the PSCCH may be replaced/substituted with at least one of the SCI, the first SCI, and/or the second SCI. Additionally/alternatively, for example, the SCI may be replaced/substituted with at least one of the PSCCH, the first SCI, and/or the second SCI. Additionally/alternatively, for example, since the transmitting UE may transmit the second SCI to the receiving UE through the PSSCH, the PSSCH may be replaced/substituted with the second SCI.

FIG. 7 shows three cast types based on an embodiment of the present disclosure.

Specifically, (a) of FIG. 7 shows broadcast-type SL communication, (b) of FIG. 7 shows unicast type-SL communication, and (c) of FIG. 7 shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Hereinafter, a cooperative awareness message (CAM) and a decentralized environmental notification message (DENM) will be described.

In vehicle-to-vehicle communication, a periodic message-type CAM, an event triggered message-type DENM, or the like may be transmitted. The CAM may include dynamic state information of the vehicle such as direction and speed, static data of the vehicle such as a size, and basic vehicle information such as an exterior illumination state, route details, or the like. A size of the CAM may be 50-300 bytes. The CAM is broadcast, and a latency shall be less than 100 ms. The DENM may be a message generated in an unexpected situation such as a vehicle breakdown, accident, or the like. A size of the DENM may be less than 3000 bytes, and all vehicles within a transmission range may receive a message. In this case, the DENM may have a higher priority than the CAM.

Hereinafter, carrier reselection will be described.

In V2X or SL communication, a UE may perform carrier reselection based on a channel busy ratio (CBR) of configured carriers and/or a ProSe per-packet priority (PPPP) of a V2X message to be transmitted. For example, the carrier reselection may be performed by a MAC layer of the UE. In various embodiments of the present disclosure, a ProSe per packet priority (PPPP) may be replaced with a ProSe per packet reliability (PPPR), and the PPPR may be replaced with the PPPP. For example, it may mean that the smaller the PPPP value, the higher the priority, and that the greater the PPPP value, the lower the priority. For example, it may mean that the smaller the PPPR value, the higher the reliability, and that the greater the PPPR value, the lower the reliability. For example, a PPPP value related to a service, packet, or message related to a high priority may be smaller than a PPPP value related to a service, packet, or message related to a low priority. For example, a PPPR value related to a service, packet, or message related to a high reliability may be smaller than a PPPR value related to a service, packet, or message related to a low reliability.

CBR may mean the portion of sub-channels in a resource pool in which a sidelink-received signal strength indicator (S-RSSI) measured by the UE is detected to be greater than a pre-configured threshold. There may be a PPPP related to each logical channel, and a configuration of the PPPP value shall reflect a latency required in both a UE and a BS. In carrier reselection, the UE may select one or more carriers from among candidate carriers starting from a lowest CBR in an ascending order of the CBR.

Hereinafter, an RRC connection establishment between UEs will be described.

For V2X or SL communication, a transmitting UE may need to establish a (PC5) RRC connection with a receiving UE. For example, the UE may obtain V2X-specific SIB. For a UE which is configured to transmit V2X or SL communication by a higher layer and which has data to be transmitted, if a frequency at which at least the UE is configured to transmit SL communication is included in the V2X-specific SIB, the UE may establish an RRC connection with another UE without including a transmission resource pool for the frequency. For example, if an RRC connection is established between the transmitting UE and the receiving UE, the transmitting UE may perform unicast communication with respect to the receiving UE through the established RRC connection.

When the RRC connection is established between the UEs, the transmitting UE may transmit an RRC message to the receiving UE.

The receiving UE may perform antenna/resource de-mapping, demodulation, and decoding for received information. The information may be transferred to the RRC layer via the MAC layer, the RLC layer, and the PDCP layer. Accordingly, the receiving UE may receive the RRC message generated by the transmitting UE.

V2X or SL communication may be supported for a UE of an RRC_CONNECTED mode, a UE of an RRC_IDLE mode, and a UE of an (NR) RRC_INACTIVE mode. That is, the UE of the RRC_CONNECTED mode, the UE of the RRC_IDLE mode, and the UE of the (NR) RRC_INACTIVE mode may perform V2X or SL communication. The UE of the RRC_INACTIVE mode or the UE of the RRC_IDLE mode may perform V2X or SL communication by using a cell-specific configuration included in V2X-specific SIB.

RRC may be used to exchange at least UE capability and AS layer configuration. For example, a UE 1 may transmit UE capability and AS layer configuration of the UE 1 to a UE 2, and the UE 1 may receive UE capability and AS layer configuration of the UE 2 from the UE 2. In case of UE capability transfer, an information flow may be triggered during or after PC5-S signaling for a direct link setup.

Hereinafter, SL radio link monitoring (RLM) will be described.

In case of AS-level link management of unicast, SL radio link monitoring (RLM) and/or radio link failure (RLF) declaration may be supported. In case of RLC acknowledged mode (AM) in SL unicast, the RLF declaration may be triggered by an indication from RLC indicating that the maximum number of retransmissions has been reached. An AS-level link status (e.g., failure) may need to be informed to a higher layer. Unlike the RLM procedure for unicast, a groupcast-related RLM design may not be considered. The RLM and/or RLF declarations may not be necessary between group members for groupcast.

For example, a transmitting UE may transmit a reference signal to a receiving UE, and the receiving UE may perform SL RLM by using the reference signal. For example, the receiving UE may declare SL RLF by using the reference signal. For example, the reference signal may be referred to as an SL reference signal.

Measurement and Reporting for SL

Hereinafter, SL measurement and reporting will be described.

For the purpose of QoS prediction, initial transmission parameter setting, link adaptation, link management, admission control, or the like, SL measurement and reporting (e.g., RSRP, RSRQ) between UEs may be considered in SL. For example, a receiving UE may receive a reference signal from a transmitting UE, and the receiving UE may measure a channel state for the transmitting UE based on the reference signal. In addition, the receiving UE may report channel state information (CSI) to the transmitting UE. SL-related measurement and reporting may include measurement and reporting of CBR and reporting of location information. Examples of channel status information (CSI) for V2X may include a channel quality indicator (CQI), a precoding matrix index (PM), a rank indicator (RI), reference signal received power (RSRP), reference signal received quality (RSRQ), pathgain/pathloss, a sounding reference symbol (SRS) resource indicator (SRI), a SRI-RS resource indicator (CRI), an interference condition, a vehicle motion, or the like. In case of unicast communication, CQI, RI, and PMI or some of them may be supported in a non-subband-based aperiodic CSI report under the assumption of four or less antenna ports. A CSI procedure may not be dependent on a standalone reference signal (RS). A CSI report may be activated or deactivated based on a configuration.

For example, the transmitting UE may transmit CSI-RS to the receiving UE, and the receiving UE may measure CQI or RI based on the CSI-RS. For example, the CSI-RS may be referred to as SL CSI-RS. For example, the CSI-RS may be confined within PSSCH transmission. For example, the transmitting UE may perform transmission to the receiving UE by including the CSI-RS on the PSSCH.

Hereinafter, physical layer processing will be described.

Based on an embodiment of the present disclosure, a data unit may be a target of physical layer processing in a transmitting side before being transmitted through a radio interface. Based on an embodiment of the present disclosure, a radio signal carrying the data unit may be a target of physical layer processing in a receiving side.

Table 7 may show a mapping relation between an uplink transport channel and a physical channel, and Table 8 may show a mapping relation between uplink control channel information and the physical channel.

TABLE 7

| Transport channel | Physical channel |
| --- | --- |
| UL-SCH (Uplink-Shared Channel) | PUSCH (Physical Uplink Shared Channel) |
| RACH (Random Access Channel) | PRACH (Physical Random Access Channel) |

TABLE 8

| Control information | Physical channel |
| --- | --- |
| UCI (Uplink Control Information) | PUCCH (Physical Uplink Control Channel) PUSCH (Physical Uplink Shared Channel) |

Table 9 may show a mapping relation between a downlink transport channel and a physical channel, and Table 10 may show a mapping relation between downlink control channel information and the physical channel.

Table 9

| Transport channel | Physical channel |
| --- | --- |
| DL-SCH (Downlink-Shared Channel) | PDSCH (Physical Downlink Shared Channel) |
| BCH (Broadcast Channel) | PBCH (Physical Broadcast Channel) |
| PCH (Paging Channel) | PDSCH (Physical Downlink Shared Channel) |

TABLE 10

| Control information | Physical channel |
| --- | --- |
| DCI (Downlink Control Information) | PDCCH (Physical Downlink Control Channel) |

Table 11 may show a mapping relation between an SL transport channel and a physical channel, and Table 12 may show a mapping relation between SL control channel information and the physical channel.

TABLE 11

| Transport channel | Physical channel |
| --- | --- |
| SL-SCH (Sidelink-Shared Channel) | PSSCH (Physical Sidelink Shared Channel) |
| SL-BCH (Sidelink-Broadcast Channel) | PSBCH (Physical Sidelink Broadcast Channel) |

TABLE 12

| Control information | Physical channel |
| --- | --- |
| SCI (Sidelink Control Information) | PSCCH (Physical Sidelink Control Channel) |

In the aforementioned physical layer processing of the transmitting/receiving side, time and frequency domain resources related to subcarrier mapping (e.g., an OFDM symbol, a subcarrier, a subcarrier frequency), OFDM modulation, and frequency up/down-conversion may be determined based on resource allocation (e.g., an uplink grant, downlink allocation).

Hybrid Automatic Repeat Request (HARQ) for SL

Hereinafter, a hybrid automatic repeat request (HARQ) procedure will be described.

An error compensation scheme is used to secure communication reliability. Examples of the error compensation scheme may include a forward error correction (FEC) scheme and an automatic repeat request (ARQ) scheme. In the FEC scheme, errors in a receiving end are corrected by attaching an extra error correction code to information bits. The FEC scheme has an advantage in that time delay is small and no information is additionally exchanged between a transmitting end and the receiving end but also has a disadvantage in that system efficiency deteriorates in a good channel environment. The ARQ scheme has an advantage in that transmission reliability can be increased but also has a disadvantage in that a time delay occurs and system efficiency deteriorates in a poor channel environment.

A hybrid automatic repeat request (HARQ) scheme is a combination of the FEC scheme and the ARQ scheme. In the HARQ scheme, it is determined whether an unrecoverable error is included in data received by a physical layer, and retransmission is requested upon detecting the error, thereby improving performance.

In case of SL unicast and groupcast, HARQ feedback and HARQ combining in the physical layer may be supported. For example, when a receiving UE operates in a resource allocation mode 1 or 2, the receiving UE may receive the PSSCH from a transmitting UE, and the receiving UE may transmit HARQ feedback for the PSSCH to the transmitting UE by using a sidelink feedback control information (SFCI) format through a physical sidelink feedback channel (PSFCH).

For example, the SL HARQ feedback may be enabled for unicast. In this case, in a non-code block group (non-CBG) operation, if the receiving UE decodes a PSCCH of which a target is the receiving UE and if the receiving UE successfully decodes a transport block related to the PSCCH, the receiving UE may generate HARQ-ACK. In addition, the receiving UE may transmit the HARQ-ACK to the transmitting UE. Otherwise, if the receiving UE cannot successfully decode the transport block after decoding the PSCCH of which the target is the receiving UE, the receiving UE may generate the HARQ-NACK. In addition, the receiving UE may transmit HARQ-NACK to the transmitting UE.

For example, the SL HARQ feedback may be enabled for groupcast. For example, in the non-CBG operation, two HARQ feedback options may be supported for groupcast.

(1) Groupcast option 1: After the receiving UE decodes the PSCCH of which the target is the receiving UE, if the receiving UE fails in decoding of a transport block related to the PSCCH, the receiving UE may transmit HARQ-NACK to the transmitting UE through a PSFCH. Otherwise, if the receiving UE decodes the PSCCH of which the target is the receiving UE and if the receiving UE successfully decodes the transport block related to the PSCCH, the receiving UE may not transmit the HARQ-ACK to the transmitting UE.

(2) Groupcast option 2: After the receiving UE decodes the PSCCH of which the target is the receiving UE, if the receiving UE fails in decoding of the transport block related to the PSCCH, the receiving UE may transmit HARQ-NACK to the transmitting UE through the PSFCH. In addition, if the receiving UE decodes the PSCCH of which the target is the receiving UE and if the receiving UE successfully decodes the transport block related to the PSCCH, the receiving UE may transmit the HARQ-ACK to the transmitting UE through the PSFCH.

For example, if the groupcast option 1 is used in the SL HARQ feedback, all UEs performing groupcast communication may share a PSFCH resource. For example, UEs belonging to the same group may transmit HARQ feedback by using the same PSFCH resource.

For example, if the groupcast option 2 is used in the SL HARQ feedback, each UE performing groupcast communication may use a different PSFCH resource for HARQ feedback transmission. For example, UEs belonging to the same group may transmit HARQ feedback by using different PSFCH resources.

For example, when the SL HARQ feedback is enabled for groupcast, the receiving UE may determine whether to transmit the HARQ feedback to the transmitting UE based on a transmission-reception (TX-RX) distance and/or RSRP.

For example, in the groupcast option 1, in case of the TX-RX distance-based HARQ feedback, if the TX-RX distance is less than or equal to a communication range requirement, the receiving UE may transmit HARQ feedback for the PSSCH to the transmitting UE. Otherwise, if the TX-RX distance is greater than the communication range requirement, the receiving UE may not transmit the HARQ feedback for the PSSCH to the transmitting UE. For example, the transmitting UE may inform the receiving UE of a location of the transmitting UE through SCI related to the PSSCH. For example, the SCI related to the PSSCH may be second SCI. For example, the receiving UE may estimate or obtain the TX-RX distance based on a location of the receiving UE and the location of the transmitting UE. For example, the receiving UE may decode the SCI related to the PSSCH and thus may know the communication range requirement used in the PSSCH.

For example, in case of the resource allocation mode 1, a time (offset) between the PSFCH and the PSSCH may be configured or pre-configured. In case of unicast and groupcast, if retransmission is necessary on SL, this may be indicated to a BS by an in-coverage UE which uses the PUCCH. The transmitting UE may transmit an indication to a serving BS of the transmitting UE in a form of scheduling request (SR)/buffer status report (BSR), not a form of HARQ ACK/NACK. In addition, even if the BS does not receive the indication, the BS may schedule an SL retransmission resource to the UE. For example, in case of the resource allocation mode 2, a time (offset) between the PSFCH and the PSSCH may be configured or pre-configured.

For example, from a perspective of UE transmission in a carrier, TDM between the PSCCH/PSSCH and the PSFCH may be allowed for a PSFCH format for SL in a slot. For example, a sequence-based PSFCH format having a single symbol may be supported. Herein, the single symbol may not an AGC duration. For example, the sequence-based PSFCH format may be applied to unicast and groupcast.

For example, in a slot related to a resource pool, a PSFCH resource may be configured periodically as N slot durations, or may be pre-configured. For example, N may be configured as one or more values greater than or equal to 1. For example, N may be 1, 2, or 4. For example, HARQ feedback for transmission in a specific resource pool may be transmitted only through a PSFCH on the specific resource pool.

For example, if the transmitting UE transmits the PSSCH to the receiving UE across a slot #X to a slot #N, the receiving UE may transmit HARQ feedback for the PSSCH to the transmitting UE in a slot #(N+A). For example, the slot #(N+A) may include a PSFCH resource. Herein, for example, A may be a smallest integer greater than or equal to K. For example, K may be the number of logical slots. In this case, K may be the number of slots in a resource pool. Alternatively, for example, K may be the number of physical slots. In this case, K may be the number of slots inside or outside the resource pool.

For example, if the receiving UE transmits HARQ feedback on a PSFCH resource in response to one PSSCH transmitted by the transmitting UE to the receiving UE, the receiving UE may determine a frequency domain and/or code domain of the PSFCH resource based on an implicit mechanism in a configured resource pool. For example, the receiving UE may determine the frequency domain and/or code domain of the PSFCH resource, based on at least one of a slot index related to PSCCH/PSSCH/PSFCH, a sub-channel related to PSCCH/PSSCH, and/or an identifier for identifying each receiving UE in a group for HARQ feedback based on the groupcast option 2. Additionally/alternatively, for example, the receiving UE may determine the frequency domain and/or code domain of the PSFCH resource, based on at least one of SL RSRP, SINR, L1 source ID, and/or location information.

For example, if HARQ feedback transmission through the PSFCH of the UE and HARQ feedback reception through the PSFCH overlap, the UE may select any one of HARQ feedback transmission through the PSFCH and HARQ feedback reception through the PSFCH based on a priority rule. For example, the priority rule may be based on at least priority indication of the related PSCCH/PSSCH.

For example, if HARQ feedback transmission of a UE through a PSFCH for a plurality of UEs overlaps, the UE may select specific HARQ feedback transmission based on the priority rule. For example, the priority rule may be based on at least priority indication of the related PSCCH/PSSCH.

Bandwidth Part and Resource Pool

Hereinafter, a bandwidth part (BWP) and a resource pool will be described.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a location change of the bandwidth, or a change in subcarrier spacing of the bandwidth.

For example, the bandwidth may be decreased during a period in which activity is low to save power. For example, the location of the bandwidth may move in a frequency domain. For example, the location of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be referred to as a bandwidth part (BWP). The BA may be performed when the BS/network configures the BWP to the UE and the BS/network informs the UE of the BWP currently in an active state among the configured BWPs.

FIG. 8 shows a plurality of BWPs based on an embodiment of the present disclosure.

Referring to FIG. 8, a BWP1 having a bandwidth of 40 MHz and a subcarrier spacing of 15 kHz, a BWP2 having a bandwidth of 10 MHz and a subcarrier spacing of 15 kHz, and a BWP3 having a bandwidth of 20 MHz and a subcarrier spacing of 60 kHz may be configured.

FIG. 9 shows a BWP based on an embodiment of the present disclosure. It is assumed in the embodiment of FIG. 9 that the number of BWPs is 3.

Referring to FIG. 9, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset NstartBWP from the point A, and a bandwidth NsizeBWP. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

The BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

A resource pool may be a group of time-frequency resources that may be used for SL transmission and/or SL reception. From a perspective of the UE, time-domain resources in the resource pool may not be consecutive. A plurality of resource pools may be (pre-)configured to the UE in one carrier. From a perspective of a physical layer, the UE may perform unicast, groupcast, and broadcast communication by using the configured or pre-configured resource pool.

Sidelink Congestion Control

Hereinafter, sidelink (SL) congestion control will be described.

If a UE autonomously determines an SL transmission resource, the UE also autonomously determines a size and frequency of use for a resource used by the UE. Of course, due to a constraint from a network or the like, it may be restricted to use a resource size or frequency of use, which is greater than or equal to a specific level. However, if all UEs use a relatively great amount of resources in a situation where many UEs are concentrated in a specific region at a specific time, overall performance may significantly deteriorate due to mutual interference.

Accordingly, the UE may need to observe a channel situation. If it is determined that an excessively great amount of resources are consumed, it is preferable that the UE autonomously decreases the use of resources. In the present disclosure, this may be defined as congestion control (CR). For example, the UE may determine whether energy measured in a unit time/frequency resource is greater than or equal to a specific level, and may adjust an amount and frequency of use for its transmission resource based on a ratio of the unit time/frequency resource in which the energy greater than or equal to the specific level is observed. In the present disclosure, the ratio of the time/frequency resource in which the energy greater than or equal to the specific level is observed may be defined as a channel busy ratio (CBR). The UE may measure the CBR for a channel/frequency. Additionally, the UE may transmit the measured CBR to the network/BS.

FIG. 10 shows a resource unit for CBR measurement based on an embodiment of the present disclosure.

Referring to FIG. 10, CBR may denote the number of sub-channels in which a measurement result value of a received signal strength indicator (RSSI) has a value greater than or equal to a pre-configured threshold as a result of measuring the RSSI by a UE on a sub-channel basis for a specific period (e.g., 100 ms). Alternatively, the CBR may denote a ratio of sub-channels having a value greater than or equal to a pre-configured threshold among sub-channels for a specific duration. For example, in the embodiment of FIG. 10, if it is assumed that a hatched sub-channel is a sub-channel having a value greater than or equal to a pre-configured threshold, the CBR may denote a ratio of the hatched sub-channels for a period of 100 ms. Additionally, the CBR may be reported to the BS.

FIG. 11 illustrates a resource pool related to CBR measurement.

For example, as shown in the embodiment of FIG. 11, if a PSCCH and a PSSCH are multiplexed, the UE may perform one CBR measurement for one resource pool. Herein, if a PSFCH resource is configured or pre-configured, the PSFCH resource may be excluded in the CBR measurement.

Further, congestion control considering a priority of traffic (e.g. packet) may be necessary. To this end, for example, the UE may measure a channel occupancy ratio (CR). Specifically, the UE may measure the CBR, and the UE may determine a maximum value CRlimitk of a channel occupancy ratio k (CRk) that can be occupied by traffic corresponding to each priority (e.g., k) based on the CBR. For example, the UE may derive the maximum value CRlimitk of the channel occupancy ratio with respect to a priority of each traffic, based on a predetermined table of CBR measurement values. For example, in case of traffic having a relatively high priority, the UE may derive a maximum value of a relatively great channel occupancy ratio. Thereafter, the UE may perform congestion control by restricting a total sum of channel occupancy ratios of traffic, of which a priority k is lower than i, to a value less than or equal to a specific value. Based on this method, the channel occupancy ratio may be more strictly restricted for traffic having a relatively low priority.

In addition thereto, the UE may perform SL congestion control by using a method of adjusting a level of transmit power, dropping a packet, determining whether retransmission is to be performed, adjusting a transmission RB size (MCS coordination), or the like.

In the present disclosure, a wording "configuration or definition" may be interpreted as being (pre-)configured from the base station or the network (via pre-defined signaling (e.g., SIB, MAC signaling, or RRC signaling). For example, "A may be configured" may include "the base station or network (pre-)configures/defines or announces A for the UE". Alternatively, the wording "configuration or definition" may be interpreted as being pre-configured or defined by a system. For example, "A may be configured" may include "A is pre-configured/defined by the system".

In the present disclosure, the following abbreviations/acronym can be used below for convenience of description.

ACK/NACK—Acknowledgement/No Acknowledgement
AGC—Automatic Gain Control
AS—Access Stratum
CB—Codeblock
CBG/CG—Codeblock Group
CBR—Channel Busy Ratio
CE—Control Element
CFO—Carrier Frequency Offset
CG—Configured Grant
CP—Cyclic Prefix
CRC—Cyclic Redundancy Check
CSI—Channel State Information
CSI-RS—Channel State Information Reference Signal
DCI—Downlink Control Channel
DL—Downlink
DM-RS—Demodulation RS
ECP—Extended CP
FDD—Frequency Division Duplex
HARQ—Hybrid Automatic Repeat Request
L1—Layer 1
L2—Layer 2
LBS—Location Based Service
LCS—Location Service
LSB—Least Significant Bit
MAC—Medium Access Control
MCS—Modulation Coding Scheme
MIB—Master Information Block
MPR—Maximum Power Reduction
MSB—Most Significant Bit
NAS—Non-Access Stratum
NCP—Normal CP
NDI—New Data Indicator
PBCH—Physical Broadcast Channel
PDCCH—Physical Downlink Control Channel
PDCP—Packet Data Convergence Protocol
PDSCH—Physical Downlink Shared Channel
PDU—Protocol Data Unit
PRS—Positioning Reference Signal
PSBCH—Physical Sidelink Broadcast Channel
PSCCH—Physical Sidelink Control Channel
PSFCH—Physical Sidelink Feedback Channel
PSS—Primary Synchronization Signal
PSSCH—Physical Sidelink Shared Channel
PUCCH—Physical Uplink Control Channel
PUSCH—Physical Uplink Shared Channel
QoS—Quality of Service
RB—Resource Block
RLC—Radio Link Control
RLM—Radio Link Monitoring
RLF—Radio Link Failure
RRC—Radio Resource Control
RS—Reference Signal
RSRP—Reference Signal Received Power
RSRQ—Reference Signal Received Quality
RSSI—Received Signal Strength Indicator
RSTD—Reference Signal Time Difference
RSU—Road Side Unit
RTT—Round Trip Time
RV—Redundancy Version
SCI—Sidelink Control Information
SCS—Sub-Carrier Spacing
SDAP—Service Data Adaptation Protocol
SIB—System Information Block
SL—Sidelink
SL OLPC—Sidelink Open Loop Power Control
SL PL—Sidelink Pathloss
SLSSID—SL Synchronixatino Signal Identification
SNR—Signal-to-Noise Ratio
SPP—Sidelink Positioning Protocol
SPS—Semi-Persistent Scheduling
S-PSS—Sidelink PSS
SRS—Sounding Reference Signal
SSB—Synchronization Signal Block
SSS—Secondary Synchronization Signal
S-SSB—Sidelink SSB
S-SSS—Sidelink SSS
TB—Transport Block
TDD—Time Division Duplex
TDOA—Time Difference of Arrival
TOA—Time of Arrival
UE—User Equipment/End
UL—Uplink
Uu-PSS—Uu link PSS
Uu-SSS—Uu link SSS
XOR—Exclusive OR In the present disclosure, for example, a transmitting UE (TX UE) may be a UE that transmits data to a (target) receiving UE (RX UE). For example, the TX UE may be a UE that performs PSCCH and/or PSSCH transmission. And/or, the TX UE may be a UE that transmits an SL CSI-RS and/or SL CSI reporting request indicator to the (target) RX UE. And/or, the TX UE may be a UE that transmits a (control) channel (e.g., PSCCH, PSSCH, etc.) and/or a reference signal (e.g., DM-RS, CSI-RS, etc.) on the (control) channel, to be used for an SL RLM and/or SL RLF operation of the (target) RX UE.

In the present disclosure, for example, the receiving UE (RX UE) may be a UE that transmits an SL HARQ feedback to the TX UE based on whether decoding of data received form the transmitting UE (TX UE) is successful and/or whether detection/decoding of the PSCCH (related to PSSCH scheduling) transmitted by the TX UE is successful. And/or, the RX UE may be a UE that performs SL CSI transmission to the TX UE based on the SL CSI-RS and/or SL CSI reporting request indicator received from the TX UE. And/or, the RX UE may be a UE that transmits, to the TX UE, an SL (L1) RSRP measurement value measured based on a (pre-defined) reference signal and/or SL (L1) RSRP reporting request indicator received from the TX UE. And/or, the RX UE may be a UE that transmits data of the RX UE itself to the TX UE. And/or, the RX UE may be a UE that performs the SL RLM and/or SL RLF operation based on a (pre-configured) (control) channel received from the TX UE and/or the reference signal on the (control) channel.

In the present disclosure, for example, when the RX UE transmits SL HARQ feedback information for the PSSCH and/or PSCCH received from the TX UE, the following schemes or some of the following schemes may be considered. Here, for example, the following schemes or some of the following schemes may also be limitedly applied only when the RX UE successfully decodes/detects the PSCCH for scheduling the PSSCH.

Option 1) The RX UE may transmit NACK information to the TX UE only when failing to decode/receive the PSSCH received from the TX UE.

Option 2) The RX UE may transmit the ACK information to the TX UE when succeeding in decoding/receiving the PSSCH received from the TX UE, and may transmit the NACK information to the TX UE when failing to decode/receive the PSSCH.

In the present disclosure, for example, the TX UE may transmit, to the RX UE, the following information or some of the following information via the SCI. For example, the TX UE may transmit some or all of the following information to the RX UE via the first SCI and/or the second SCI.

PSSCH (and/or PSCCH) related resource allocation information (e.g., time/frequency resource location/number, resource reservation information (e.g., periodicity))

SL CSI reporting request indicator or SL (L1) RSRP (and/or SL (L1) RSRQ and/or SL (L1) RSSI) reporting request indicator SL CSI transmission indicator (on PSSCH) (or SL (L1) RSRP (and/or SL (L1) RSRQ and/or SL (L1) RSSI) information transmission indicator)

MCS information

TX POWER information

L1 DESTINATION ID information and/or L1 SOURCE ID information

SL HARQ PROCESS ID information

NDI information

RV information (Transmission TRAFFIC/PACKET related) QoS information (e.g., PRIORITY information)

SL CSI-RS transmission indicator or information on the number of (transmitted) SL CSI-RS antenna ports TX UE location information or location (or distance area) information of a target RX UE (requesting SL HARQ feedback)

Reference signal (e.g., DM-RS, etc.) information related to decoding (and/or channel estimation) of data transmitted on the PSSCH. For example, the reference signal information may be information related to a pattern of a (time-frequency) mapping resource of the DM-RS, RANK information, antenna port index information, etc.

In the present disclosure, since the TX UE may transmit, to the RX UE, the SCI, the first SCI, and/or the second SCI via the PSCCH, the PSCCH may be replaced/substituted with SCI and/or first SCI and/or second SCI. And/or, the SCI may be replaced/substituted with the PSCCH and/or first SCI and/or second SCI. And/or, since the TX UE may transmit the second SCI to the RX UE via the PSSCH, the PSSCH may be replaced/substituted with the second SCI.

In the present disclosure, for example, when SCI configuration fields are divided into two groups by considering a (relatively) high SCI payload size, first SCI including a first SCI configuration field group may be referred to as FIRST SCI, and second SCI including a second SCI configuration field group may be referred to as SECOND SCI. For example, the FIRST SCI may be transmitted to the RX UE via the PSCCH. For example, the SECOND SCI may be transmitted to the RX UE via (standalone) PSCCH or piggybacked and transmitted jointly with data via the PSSCH.

In the present disclosure, for example, "configuration" or "definition" may mean (PRE)CONFIGURATION (resource-pool specifically) (via pre-defined signaling (e.g., SIB, MAC, RRC, etc.) from the base station or the network.

In the present disclosure, for example, since RLF may be determined based on an OUT-OF-SYNCH (OOS) indicator or an IN-SYNCH (IS) indicator, the RLF may be replaced/substituted with OUT-OF-SYNCH (OOS) or IN-SYNCH (IS).

In the present disclosure, for example, RB may be replaced/substituted with SUBCARRIER. For example, in the present disclosure, PACKET or TRAFFIC may be replaced/substituted with TB or MAC PDU based on a transmitted layer.

In the present disclosure, CBG or CG may be replaced/substituted with TB.

In the present disclosure, for example, SOURCE ID may be replaced/substituted with DESTINATION ID.

In the present disclosure, for example, L1 ID may be replaced/substituted with L2 ID. For example, L1 ID may be L1 SOURCE ID or L1 DESTINATION ID. For example, L2 ID may be L2 SOURCE ID or L2 DESTINATION ID.

In the present disclosure, for example, an operation of reserving/selecting/determining a retransmission resource by the transmitting UE may mean an operation of reserving/selecting/determining, by the transmitting UE, a potential retransmission resource for whether is to be determined to be actually used based on the SL HARQ feedback information received from the receiving UE.

In the present disclosure, SL MODE 1 may mean a resource allocation scheme or a communication scheme in which the base station directly schedules a sidelink transmission (SL TX) resource of the UE via pre-defined signaling (e.g., DCI). Further, for example, SL MODE 2 may mean a resource allocation scheme or a communication scheme in which the UE independently selects the SL TX resource within a resource pool configured or pre-configured from the base station or network.

In the present disclosure, for example, for convenience of description, a (physical) channel that the RX UE uses when transmitting at least one of the following information to the TX UE may be referred to as a physical sidelink feedback channel (PSFCH).

SL HARQ feedback, SL CSI, SL (L1) RSRP

The base station may allocate the UE a resource (hereinafter, "SL resource") used for transmission and reception of SL channel/signal. For example, the base station may transmit information related to the resources to the UE. In the present disclosure, a scheme in which the base station allocates the SL resource to the UE may be referred to as mode 1 scheme, mode 1 operation, or resource allocation mode 1.

On the other hand, the UE may select the SL resource within a resource pool based on the sensing. In the present disclosure, a scheme in which the UE selects the SL resource may be referred to as mode 2 scheme, mode 2 operation, or resource allocation mode 3. For example, in the resource allocation mode 2, the UE may detect SCI transmitted by another UE, the UE may identify a resource reserved by another UE based on the SCI, and the UE may acquire an RSRP measurement value. And, the UE may select a resource to be used for the SL transmission except for a specific resource within a resource selection window based on the sensing result. For example, the specific resource may be based on resource(s) (e.g., removed or dropped resource(s)) based on the above Table 5.

For the sensing operation, the UE may refer to resource allocation information received via the first SCI. However, due to overhead of the first SCI, an amount of information that the UE can acquire on the first SCI may be limited.

According to various embodiments of the present disclosure, a second UE may transmit additional assistance information in order to assist a sensing operation and/or a resource (re)selection operation of a first UE. For PSSCH detection performance improvement and/or half-duplex limit reduction and/or reserved resource selection for transmission and reception of a specific signal, etc., the first UE may use the assistance information received from the second UE. In an embodiment of the present disclosure, for convenience of explanation, it is assumed that a UE-A transmits assistance information to a UE-B. It is also assumed that the UE-B selects a resource for PSCCH/PSSCH to be transmitted to the UE-A and/or a resource for PSCCH/PSSCH to be transmitted to a UE-C (i.e., a third UE) based on the assistance information received from the UE-A.

FIG. 12 illustrates a procedure in which a UE-A transmits assistance information to a UE-B based on an embodiment of the present disclosure. The embodiment of FIG. 12 may be combined with various embodiments of the present disclosure.

Referring to FIG. 12, in step S1200, the UE-A may transmit assistance information to the UE-B. For example, the UE-B may select a resource for PSCCH/PSSCH to be transmitted to the UE-A based on the assistance information received from the UE-A, and the UE-B may perform SL transmission using the resource. For example, the UE-B may select a resource for PSCCH/PSSCH to be transmitted to the UE-C based on the assistance information received from the UE-A, and the UE-B may perform SL transmission using the resource. In the present disclosure, the assistance information may be referred to as additional information.

On the other hand, when UE-A transmits a preferred or non-preferred resource for transmission to assist UE-A in selecting a resource, it may be transmitted through PSCCH/PSSCH according to the amount of information, in this case, the UE-A may perform resource (re)selection on its own to secure the PSCCH/PSSCH resources, which may reduce the efficiency of the resource reselection method using auxiliary information. On the other hand, PSCCH/PSSCH transmission including the auxiliary information may cause problems such as increasing congestion again or causing a HALF-DUPLEX problem due to the transmission.

According to an embodiment of the present disclosure, UE-A may transmit information or an indicator triggering reselection for selection/reservation resources for UE-B transmission to UE-B. For example, the resource reselection indicator or the resource conflict indicator may be transmitted from UE-A to UE-B through a PSFCH resource or in a PSFCH format. According to an embodiment of the present disclosure, the PSFCH resource for the resource conflict indicator or its candidate set may be configured independently (in advance) of PSFCH resource configuration for SL HARQ-ACK, or may be configured between UEs as PC5-RRC.

According to an embodiment of the present disclosure, the PSFCH resource for the resource conflict indicator or its candidate set may inherits all or part of the PSFCH resource configuration for SL HARQ-ACK (e.g. PSFCH resource period) and/or the PSFCH state (ACK or NACK, m_CS value) may be configured separately (in advance) or configured as PC5-RRC. For example, the PSFCH resource period for the resource conflict indicator may be equal to and/or larger than the PSFCH resource period for SL HARQ-ACK.

On the other hand, depending on the time point at which the resource conflict indicator is transmitted, its effect may be significantly reduced to indicate a resource conflict that may occur in reserved resources of UE-B. More specifically, UE-A has no choice but to determine whether or not there is a resource conflict for reserved resources of UE-B based on information obtained before transmitting the resource conflict indicator. If a resource conflict factor occurs between the time point at which the resource conflict indicator is transmitted and the time point of reserved resources, the use effect of the resource conflict indicator may be greatly reduced. It will be described with reference to FIG. 13 below.

FIG. 13 is a diagram for explaining an example of a monitoring region according to a transmission time point of PSFCH related to conflict information.

Referring to FIG. 13, when it is assumed that the PSFCH related to the conflict information is transmitted in slot n, UE-A may consider only factors that may cause resource conflict before slot n-T_proc,0. In this case, when the time interval between the transmission time point of the PSFCH and the resource with resource conflict is large, the advantage according to the resource conflict indicator signaling may be limited. Specifically, it can be assumed that the PSFCH decision rule for SL HARQ-ACK feedback is directly reused. That is, when the PSFCH is transmitted in a resource (slot) determined based on PSSCH-to-PSFCH timing (e.g. a slot after a slot according to PSSCH-to-PSFCH timing after an SCI reception slot), a conflict factor (1) occurring after the PSFCH transmission time point cannot be considered. In other words, the conflict factor (1) cannot be considered in a monitoring region for generating inter-UE coordination information (e.g. a resource conflict indicator).

Considering that the resource reservation period can be hundreds of msec, the method of determining the transmission time point of the PSFCH based on the SCI for performing the resource reservation does not completely cover resource conflict due to aperiodic UL or SL transmission.

Accordingly, it may be necessary to define a mapping relationship between the PSFCH resource for the resource conflict indicator and the PSSCH resource corresponding to the resource conflict differently from the SL HARQ-ACK feedback. In addition, processing time for resource reselection needs to be secured when UE-B receives a resource conflict indicator, which needs to be considered in the mapping relationship. In addition, it is necessary to secure processing time for UE-A to recognize a resource conflict factor (for example, SCI received by UE-A, and/or selection/reservation resources of UE-A and/or UL transmission time point of UE-A and/or LTE-SL transmission time point of UE-A, etc.) and generate and transmit a resource conflict indicator again.

For example, a minimum distance between a PSFCH slot for resource conflict indicator transmission and a PSSCH resource slot corresponding to resource conflict may be configured (in advance), or may be configured as PC5-RRC between UE-A and UE-B.

For example, the minimum distance may be defined for a slot belonging to a (specific) resource pool. For example, the resource pool may be a reception resource pool of UE-B, and may be configured (in advance) or may be configured as PC5-RRC between UE-A and UE-B.

For example, a minimum distance between a PSFCH slot for indicator transmission and a PSSCH resource slot corresponding to a resource conflict may be a value of T3 (e.g. a PRE-EMPTION CHECK time point for a specific resource time point), a value of T_PROC,1, or a logical slot conversion value (the number of slots belonging to the resource pool) thereof. It will be described with reference to FIG. 14 below.

FIG. 14 is a diagram for explaining another example of a monitoring region according to a transmission time point of PSFCH related to conflict information. A slot for PSFCH transmission may be a slot determined based on a reserved resource (slot) corresponding to a resource conflict and T_PROC,1 (or T3). For example, referring to FIG. 14, PSFCH may be transmitted in a slot before at least T_PROC,1 from a reserved resource (slot) corresponding to the resource conflict. In this case, since the monitoring region for generating inter-UE coordination information (e.g. a resource conflict indicator) is expanded compared to the case of FIG. 13, the conflict factor (①) that could not be considered in the monitoring region of FIG. 13 can be considered. For example, a specific value of T3 or T_PROC,1 may be determined based on Table 6 above.

For example, the minimum distance between the PSFCH slot for transmitting the indicator and the PSSCH resource slot corresponding to the resource conflict may additionally include processing time required for PSFCH detection. For example, the configuration value for the minimum distance between the PSFCH slot for transmitting the indicator and the PSSCH resource slot corresponding to the resource conflict may be configured to be greater than and/or equal to the T3 value (e.g. a PRE-EMPTION CHECK time point for a specific resource time point), the T_PROC,1 value or the logical slot conversion value (the number of slots belonging to the resource pool) thereof.

For example, the minimum value of the configuration value for the minimum distance between the PSFCH slot for transmitting the indicator and the PSSCH resource slot corresponding to the resource conflict may additionally include the processing time required for PSFCH detection. Hereinafter, for convenience of description, the minimum distance between the PSFCH slot for transmitting the indicator and the PSSCH resource slot corresponding to the resource conflict is indicated as K. For example, a plurality of K values may be configured (in advance) as a method for increasing opportunities to transmit the resource conflict indicator for the same PSSCH resource.

For example, the PSFCH slot for transmitting the resource conflict indicator may be located at a time point earlier than the PSSCH resource slot corresponding to a resource conflict. For example, the resource conflict indicator may be linked/transmitted in the latest PSFCH resource slot prior to K logical slots from the PSSCH resource slot corresponding to the resource conflict. That is, the mapping scheme of PSSCH-TO-PSFCH may be applied in reverse order in time in SL HARQ-ACK feedback. For example, according to the PSFCH resource period, the number of PSSCH resource slots interlocked with the PSFCH slot for the resource conflict indicator may be equal to and/or less than the period value. For example, based on the PSFCH frequency-side and/or code-side resources within the PSFCH slot, the PSSCH resource slot interlocked thereto and/or starting sub-channels and/or allocation sub-channels of PSSCH resources may be distinguished. For example, the order of PSSCH slots considered when mapping between PSSCH resources and PSFCH resources (when determining a set of PSFCH candidate resources) may be forward or backward.

According to an embodiment of the present disclosure, the above mapping method may be applied when a resource conflict is indicated for future reserved resources of UE-B. For example, when a resource conflict is indicated for future reserved resources of UE-B, the PSFCH resource for the resource conflict indicator may be located after the PSSCH resource time point for the resource conflict. Alternatively, for example, the UE-B may defer the action decision for emptying the transmission buffer until the PSFCH transmission time point for indicating resource conflict corresponding to the next retransmission resource for the same TB instead of emptying the transmission buffer immediately after receiving the SL HARQ-ACK. For example, UE-A may instruct UE-B by distinguishing whether to use the retransmission resource as it is and/or to reselect the resource and/or not to use the resource through the resource conflict indicator.

On the other hand, UE-A may receive the SCI and process it to determine whether or not resource conflict exists for the selected/reserved resources of UE-B. On the other hand, UE-A may receive a UL GRANT and process it to determine whether UE-A cannot perform SL reception for the selected/reserved resources of UE-B. On the other hand, UE-A may receive the SL DCI and process it to determine whether UE-A cannot perform SL reception for the selected/reserved resources of UE-B. On the other hand, UE-A may trigger resource reselection and process it to determine whether or not UE-A cannot perform SL reception for the selected/reserved resource of UE-B. Depending on the processing time, resource conflict may be defined only for cases that can be recognized before the PSFCH transmission time point for resource conflict indicator transmission.

For example, when the PSFCH transmission time point for transmitting a resource conflict indicator corresponding to a specific selection/reservation resource of UE-B is slot n, the UE-A may determine whether to transmit the resource conflict indicator only based on information obtained before a specific time point T from the time point. That is, the specific time point T may be defined as a time point after slot(s) according to a value of T from the slot in which the PSCCH (SCI) related to the reserved resource is received. For example, the T value may be T_proc,0, which is a processing time for the sensing result of the UE. For example, the T value may be PUSCH PREPARATION PROCEDURE TIME. For example, the T value may be a minimum time value of PSSCH-TO-PSFCH for SL HARQ-ACK feedback. For example, the T value may be determined as a maximum value, a minimum value, or an average value among values according to the embodiment.

For example, when UE-A receives SCI from UE-B and recognizes that PSSCH reserved resources exist in SLOT #N1, SLOT #N2, and SLOT #N3, and determines that resource conflict has occurred in SLOT #N2, UE-A may acquire a PSFCH resource for a resource conflict indicator corresponding thereto based on PSSCH resource information reserved for SLOT #N2 and transmit the resource conflict indicator through this. For example, the PSFCH resource may be determined based on SLOT #N2 and a preset number of slots (e.g. T3 or Tproc_1). The preset number of slots may mean a minimum distance between the PSFCH resource and SLOT #N2. The PSFCH may be transmitted in a slot before at least T3 (or Tproc_1) from SLOT #N2.

When UE-B receives a resource conflict indicator from UE-A, it may perform reselection on a PSSCH resource corresponding to the corresponding PSFCH.

On the other hand, when UE-A determines whether to transmit a resource conflict indicator, reference factors may be different when transmission of UE-B is directed to UE-A and to other UEs. More specifically, assuming that UE-B transmits PSCCH/PSSCH to UE-A, UE-A may transmit a resource conflict indicator for the resource when UE-A cannot receive PSCCH/PSSCH transmission of UE-B due to SL and/or UL transmission or LTE SL transmission/reception, etc. On the other hand, assuming that UE-B transmits PSCCH/PSSCH to UEs other than UE-A, UE-A may transmit a resource conflict indicator depending on resource overlap between UE-B and another UE or whether HALF-DUPLEX occurs between UE-B and another UE. On the other hand, in the case of periodically reserved resources of UE-B, the target receiving UE of UE-B may be different for each period.

For example, when UE-A transmits a resource conflict indicator to UE-B, information on factors referred to (whether UE-A utilizes information on a sidelink reception unavailable region) may be configured and/or different PSFCH resources (frequency and/or code resources) and/or different PSFCH state values may be configured based on whether UE-A is the receiving UE of UE-B or not.

In this case, for example, UE-B having received a resource conflict indicator for a case where UE-A is a receiving UE of UE-B from UE-A may perform resource reselection based on the resource conflict indicator when the resource corresponding to the resource conflict indicator is actually used to transmit to UE-A, and may ignore/skip the resource conflict indicator when transmitting to other UEs.

Conversely, UE-B having received a resource conflict indicator for a case in which UE-A is not a receiving UE of UE-B from UE-A may use the resource conflict indicator when transmitting resources corresponding to the resource conflict indicator to a UE other than UE-A or to a receiving UE for previous transmission of UE-B, and/or ignore/skip the resource conflict indicator when used to transmit to UE-A.

On the other hand, it may be difficult to include sufficient information in the resource conflict indicator, and accordingly, a method for distinguishing UE-A from UE-B needs to be determined. For example, the PSFCH resource and/or PSFCH state value for the resource conflict indicator may be determined based on a (L1 or L2) source ID of UE-A and/or a (L1 or L2) destination ID where UE-A expects reception.

For example, when transmission for the same TB as the resource indicated by the resource conflict indicator previously exists, it may be to determine that a UE expecting reception based on the destination ID used in the previous transmission or a UE having the destination ID as a source ID is UE-A. For example, when UE-B performs transmission in the previous period of the resource indicated by the resource conflict indicator, it may be to determine that a UE expecting reception of the destination ID used in the previous transmission or a UE having the destination ID as a source ID is UE-A.

On the other hand, it may be difficult to include sufficient information in the resource conflict indicator, and accordingly, it is necessary for UE-B to determine a method for distinguishing criteria for how UE-A determines/transmits the resource conflict indicator.

For example, when UE-B performs transmission in the previous period of the resource indicated by the resource conflict indicator, it may be determined that UE-A has determined the resource conflict indicator by assuming the destination ID and/or cast type used in the previous transmission and/or whether SL HARQ-ACK is activated and/or SL HARQ-ACK option. In this case, for example, when the PSCCH/PSSCH transmission method to be used in the period is different from the transmission method used in reserved/selected resources in the previous period, UE-B may ignore the resource conflict indicator information (for example, in the case of HALF-DUPLEX), and when the PSCCH/PSSCH transmission method to be used in the above period is entirely or partially identical to the transmission method used in the reservation/selection resource of the previous period (for example, SOURCE ID and/or DESTINATION ID and/or whether SL HARQ-ACK feedback is activated and/or cast type and/or SL HARQ-ACK feedback options), UE-B may perform resource (re)selection using resource conflict indicator information.

For example, the priority value of the PSFCH for the resource conflict indicator may be a transmission priority value that UE-B was scheduled to use for a resource corresponding to the resource conflict indicator. In this case, for example, the PSFCH priority may be applied only when the PSFCH is received. For example, the PSFCH priority may be configured (in advance) during PSFCH transmission, or may be the maximum or minimum value among possible priority values. For example, if UE-B has previous transmission of the same TB for the resource corresponding to the resource conflict indicator and/or if UE-B transmits in the selection/reservation resource of the previous period, the priority value of the PSFCH for the resource conflict indicator may succeed the priority value used in the previous transmission.

Various embodiments of the present disclosure can be combined with each other.

From an implementation point of view, operations of the first UE (UE-A)/second UE (UE-B) (e.g. operations related to transmission and reception of PSFCH) according to the above-described embodiments may be processed by the devices of FIGS. 17 to 22 to be described later (e.g. processors 102 and 202 of FIG. 18).

In addition, the operations of the first UE (UE-A)/second UE (UE-B) according to the above-described embodiment (e.g. operations related to transmission and reception of the PSFCH) may be stored in a memory (e.g. 104, 204 in FIG. 18) in the form of commands/programs (e.g. instruction, executable code) for driving at least one processor (e.g. 102, 202 in FIG. 18).

Hereinafter, the above-described embodiments will be described in detail with reference to FIG. 15 in terms of operation of the first UE. The methods described below are only classified for convenience of explanation, and it goes without saying that that some components of one method may be substituted with some components of another method, or may be applied in combination with each other, unless mutually excluded.

FIG. 15 is a flowchart for explaining a method of a first User Equipment (UE) for transmitting a physical sidelink feedback channel (PSFCH) in a wireless communication system according to an embodiment of the present disclosure.

Referring to FIG. 15, a method of a first User Equipment (UE) for transmitting a Physical Sidelink Feedback Channel (PSFCH) in a wireless communication system according to an embodiment of the present disclosure may includes receiving configuration information related to the PSFCH (S1510) and receiving PSCCH (S1520), and transmitting the PSFCH (S1530).

In S1510, the first UE receives the configuration information related to the PSFCH from the second UE. In this case, the first UE may be UE-A according to the above-described embodiments, and the second UE may mean UE-B. The configuration information related to the PSFCH may be information received based on an RRC message (e.g. SL-PSFCH-Config). The configuration information related to the PSFCH may be received based on a PC5 RRC connection between the first UE and the second UE.

For example, the configuration information related to the PSFCH may include information related to resources of the PSFCH. The information related to the resource of the PSFCH may include information (e.g. minimum time value of PSSCH-TO-PSFCH described above) indicating a minimum interval between a slot for receiving the PSCCH and a slot for transmitting the PSFCH for transmitting HARQ-ACK information related to the PSCCH. The information indicating the minimum slot interval for transmission of the PSFCH may be based on a higher layer parameter sl-MinTimeGapPSFCH.

According to the above-described S1510, an operation in which the first UE (100/200 of FIGS. 17 to 22) receives configuration information related to the PSFCH from the second UE (100/200 of FIGS. 17 to 22) may be implemented by the devices of FIGS. 17 to 22. For example, referring to FIG. 18, one or more processors 102 may control one or more transceivers 106 and/or one or more memories 104 to receive configuration information related to the PSFCH from a second UE 200.

In S1520, the first UE receives a physical sidelink control channel (PSCCH) from the second UE. The PSCCH may be related to scheduling of a Physical Sidelink Shared Channel (PSSCH). Sidelink Control Information (SCI) may be transmitted through the PSCCH. The PSCCH may be based on (a) of FIG. 6 or (b) of FIG. 6.

According to the above-described S1520, an operation in which the first UE (100/200 of FIGS. 17 to 22) receives a Physical Sidelink Control Channel (PSCCH) from the second UE (100/200 of FIGS. 17 to 22) may be implemented by the devices of FIGS. 17 to 22. For example, referring to FIG. 18, one or more processors 102 may control one or more transceivers 106 and/or one or more memories 104 to receive a Physical Sidelink Control Channel (PSCCH) from the second UE 200.

In S1530, the first UE transmits the PSFCH to the second UE.

The PSFCH may include i) HARQ-ACK information related to a reception of the PSSCH or ii) conflict information related to a reception of the PSSCH The PSFCH related to the HARQ-ACK information may be based on the PSFCH transmitted for HARQ feedback in the above-described Hybrid Automatic Repeat Request (HARQ) for SL and related embodiment(s). The PSFCH related to the conflict information may be based on the PSFCH for transmission of the above-described resource conflict indicator and related embodiment(s).

According to an embodiment, based on the PSFCH including the conflict information, the PSFCH may be transmitted in a slot. The slot may be determined based on a reserved resource based on Sidelink Control Information (SCI) related to the PSCCH and a preset number of slots.

For example, the slot may be based on a slot which is before the reserved resource based on the SCI. The preset number of slots may represent a minimum interval between the reserved resource based on the SCI and the slot. That is, the slot may mean a slot which is before at least the preset number of slots from a reserved resource (slot) based on the SCI. The slot may mean the latest slot among slots which are before the preset number of slots from the reserved resource (slot) based on the SCI. The latest slot may mean the closest slot (latest slot) in terms of reserved resources (slots) based on the SCI.

According to an embodiment, the preset number of slots may be determined based on a value (e.g. T3) configured for checking whether a sidelink resource is preempted. The T3 may be configured to be equal to a value based on $T_{proc,1}^{SL}$ in Table 6 above.

According to an embodiment, the preset number of slots may be determined based on a processing time (e.g. the T_proc,1) configured for selection of a sidelink resource.

For example, the slot may include a slot after the slot determined based on a preset value from the slot receiving the SCI. That is, the slot may be based on a slot existing between the first time point and the second time point. The first time point may refer to a time point after a slot determined based on the preset value from the slot receiving the SCI. The preset value may be based on the T value related to the above-described resource conflict indicator transmission. For example, the preset value may mean a value configured as a minimum interval between a slot for receiving the PSSCH and a slot for transmitting the PSFCH related to the HARQ-ACK information (e.g. the minimum time value of PSSCH-TO-PSFCH described above (higher layer parameter sl-MinTimeGapPSFCH)). For example, the preset value may be T_proc,0, which is a processing time for the sensing result of the first UE.

The second time point may mean a time point before the preset number of slots from reserved resources based on the SCI.

According to an embodiment, the conflict information may be based on information obtained at a time point before the slot determined based on the preset value. For example, when the slot is n, the conflict information may be determined only based on information obtained before a specific time point from the corresponding slot n. The specific time point may be a time point determined based on the above-described T value.

According to an embodiment, based on the PSFCH including the conflict information, a priority related to a reception of the PSFCH by the second UE is determined based on a priority related to the reserved resource based on the SC. The priority related to the reserved resource based on the SCI may mean a priority for transmission of the PSSCH by the second UE.

According to an embodiment, the PSFCH related to the conflict information may be transmitted based on inability to receive the PSSCH in the reserved resource based on the SCI due to half-duplex operation of the first UE. The half-duplex operation of the first UE may include a transmission operation or a reception operation of the first UE.

According to an embodiment, the PSFCH related to the conflict information may be transmitted based on overlapping of the reserved resource based on the SCI with a reserved resource based on SCI of a third UE. The third UE may mean a UE different from the second UE.

According to the above-described S1530, an operation in which the first UE (100/200 of FIGS. 17 to 22) transmits the PSFCH to the second UE (100/200 of FIGS. 17 to 22) may be implemented by the devices of FIGS. 17 to 22. For example, referring to FIG. 18, one or more processors 102 may control one or more transceivers 106 and/or one or more memories 104 to transmit the PSFCH to the second UE 200.

Hereinafter, the above-described embodiments will be described in detail with reference to FIG. 16 in terms of operation of the second UE. The methods described below are only classified for convenience of explanation, and it goes without saying that that some components of one method may be substituted with some components of another method, or may be applied in combination with each other, unless mutually excluded.

FIG. 16 is a flowchart for explaining a method of a second User Equipment (UE) for receiving a physical sidelink feedback channel (PSFCH) in a wireless communication system according to another embodiment of the present disclosure.

Referring to FIG. 16, a method of a second User Equipment (UE) for receiving a Physical Sidelink Feedback Channel (PSFCH) in a wireless communication system according to another embodiment of the present disclosure may includes transmitting configuration information related to the PSFCH (S1610), transmitting a PSCCH (S1620) and receiving the PSFCH (S1630).

In S1610, the second UE transmits the configuration information related to the PSFCH to the first UE. In this case, the second UE may be UE-B according to the above-described embodiments, and the first UE may mean UE-A. The configuration information related to the PSFCH may be information transmitted based on an RRC message (e.g. SL-PSFCH-Config). The configuration information related to the PSFCH may be transmitted based on a PC5 RRC connection between the second UE and the first UE.

For example, the configuration information related to the PSFCH may include information related to resources of the PSFCH. The information related to the resources of the PSFCH may include information indicating a minimum interval (e.g. a minimum time value of PSSCH-TO-PSFCH described above) between a slot for transmitting the PSCCH and a slot for receiving the PSFCH for receiving HARQ-ACK information related to the PSCCH. The information representing the minimum interval of slots for receiving the PSFCH may be based on a higher layer parameter sl-MinTimeGapPSFCH.

According to the above-described S1610, an operation in which the second UE (100/200 of FIGS. 17 to 22) transmits the configuration information related to the PSFCH to the first UE (100/200 of FIGS. 17 to 22) may be implemented by the devices of FIGS. 17 to 22. For example, referring to FIG. 18, one or more processors 202 may control one or more transceivers 206 and/or one or more memories 204 to transmit the configuration information related to the PSFCH to a first UE 100.

In S1620, the second UE transmits a physical sidelink control channel (PSCCH) to the first UE. The PSCCH may be related to scheduling of a Physical Sidelink Shared Channel (PSSCH). Sidelink Control Information (SCI) may be transmitted through the PSCCH. The PSCCH may be based on (a) of FIG. 6 or (b) of FIG. 6.

According to the above-described S1620, an operation in which the second UE (100/200 of FIGS. 17 to 22) transmits the physical sidelink control channel (PSCCH) to the first UE (100/200 of FIGS. 17 to 22) may be implemented by the devices of FIGS. 17 to 22. For example, referring to FIG. 18, one or more processors 202 may control one or more transceivers 206 and/or one or more memories 204 to transmit the Physical Sidelink Control Channel (PSCCH) to a first UE 100.

In S1630, the second UE receives the PSFCH from the first UE.

The PSFCH may include i) HARQ-ACK information related to a reception of the PSSCH by the first UE or ii) conflict information related to a reception of the PSSCH by the first UE.

The PSFCH related to the HARQ-ACK information may be based on the PSFCH received for HARQ feedback in the above-described Hybrid Automatic Repeat Request (HARQ) for SL and related embodiment(s). The PSFCH related to the conflict information may be based on the PSFCH for reception of the above-described the resource conflict indicator and related embodiment(s).

According to an embodiment, based on the PSFCH including the conflict information, the PSFCH may be received in a slot. The slot may be determined based on a reserved resource based on sidelink control information (SCI) related to the PSCCH and a preset number of slots.

For example, the slot may be based on a slot which is before the reserved resource based on the SCI. The preset number of slots may represent a minimum interval between the reserved resource based on the SCI and the slot. That is, the slot may mean a slot which is before at least the preset number of slots from the reserved resource (slot) based on the SCI. The slot may mean the latest slot among slots which are before the preset number of slots from the reserved resource (slot) based on the SCI. The latest slot may mean the closest slot (latest slot) in terms of reserved resources (slot) based on the SCI.

According to an embodiment, the preset number of slots may be determined based on a value (e.g. T3) configured for checking whether a sidelink resource is preempted. The T3 may be configured to be equal to a value based on $T_{proc,1}^{SL}$ in Table 6 above.

According to an embodiment, the preset number of slots may be determined based on a processing time (e.g. the T_proc,1) configured for selection of a sidelink resource.

For example, the slot may include a slot after the slot determined based on a preset value from the slot transmitting the SCI (a slot in which the first UE receives the SCI). That is, the slot may be based on a slot existing between the first time point and the second time point. The first time point may refer to a time point after a slot determined based on the preset value from the slot transmitting the SCI (a slot in which the first UE receives the SCI). The preset value may be based on the T value related to the above-described resource conflict indicator transmission. For example, the preset value may mean a value configured as a minimum interval between a slot for transmitting the PSSCH and a slot for receiving the PSFCH related to the HARQ-ACK information (e.g. the minimum time value of PSSCH-TO-PSFCH described above (higher layer parameter sl-MinTimeGapPSFCH)). For example, the preset value may be T_proc,0, which is a processing time for the sensing result of the first UE.

The second time point may mean a time point before the preset number of slots from reserved resources based on the SCI.

According to an embodiment, the conflict information may be based on information obtained at a time point before the slot determined based on the preset value. For example, when the slot is n, the conflict information may be determined only based on information obtained before a specific time point from the corresponding slot n. The specific time point may be a time point determined based on the above-described T value.

According to an embodiment, based on the PSFCH including the conflict information, a priority related to a reception of the PSFCH may be determined based on a priority related to a reserved resource based on the SCI. The priority related to the reserved resource based on the SCI may mean a priority for transmission of the PSSCH.

According to an embodiment, the PSFCH related to the conflict information may be received based on an inability to receive the PSSCH in the reserved resource based on the SCI due to half-duplex operation of the first UE. The half-duplex operation of the first UE may include a transmission operation or a reception operation of the first UE.

According to an embodiment, the PSFCH related to the conflict information may be received based on overlapping of the reserved resource based on the SCI with a reserved resource based on SCI of a third UE. The third UE may mean a UE different from the second UE.

According to the above-described S1630, an operation in which the second UE (100/200 of FIGS. 17 to 22) receives the PSFCH from the first UE (100/200 of FIGS. 17 to 22) may be implemented by the devices of FIGS. 17 to 22. For example, referring to FIG. 18, one or more processors 202 may control one or more transceivers 206 and/or one or more memories 204 to receive the PSFCH from the first UE 100.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 17 shows a communication system 1 based on an embodiment of the present disclosure.

Referring to FIG. 17, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

FIG. 18 shows wireless devices based on an embodiment of the present disclosure.

Referring to FIG. 18, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 17.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) based on the descriptions, functions, procedures, proposals, methods, and/or operational flowcharts disclosed in this document. The one or more processors 102 and 202 may generate messages, control information, data, or information based on the descriptions, functions, procedures, proposals, methods, and/or operational flowcharts disclosed in this document. The one or more processors 102 and 202 may generate signals (e.g., baseband signals) including PDUs, SDUs, messages, control information, data, or information based on the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information based on the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

FIG. 19 shows a signal process circuit for a transmission signal based on an embodiment of the present disclosure.

Referring to FIG. 19, a signal processing circuit 1000 may include scramblers 1010, modulators 1020, a layer mapper 1030, a precoder 1040, resource mappers 1050, and signal generators 1060. An operation/function of FIG. 19 may be performed, without being limited to, the processors 102 and 202 and/or the transceivers 106 and 206 of FIG. 18. Hardware elements of FIG. 19 may be implemented by the processors 102 and 202 and/or the transceivers 106 and 206 of FIG. 18. For example, blocks 1010 to 1060 may be implemented by the processors 102 and 202 of FIG. 18. Alternatively, the blocks 1010 to 1050 may be implemented by the processors 102 and 202 of FIG. 18 and the block 1060 may be implemented by the transceivers 106 and 206 of FIG. 18.

Codewords may be converted into radio signals via the signal processing circuit 1000 of FIG. 19. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 19. For example, the wireless devices (e.g., 100 and 200 of FIG. 18) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

FIG. 20 shows another example of a wireless device based on an embodiment of the present disclosure. The wireless device may be implemented in various forms based on a use-case/service (refer to FIG. 17).

Referring to FIG. 20, wireless devices 100 and 200 may correspond to the wireless devices 100 and 200 of FIG. 18 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 18. For example, the transceiver(s) 114 may include the one or more transceivers 106 and 206 and/or the one or more antennas 108 and 208 of FIG. 18. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured based on types of wireless devices. For example, the additional components 140 may include at least one of a power unit/battery, input/output (I/O) unit, a driving unit, and a computing unit. The wireless device may be implemented in the form of, without being limited to, the robot (100a of FIG. 17), the vehicles (100b-1 and 100b-2 of FIG. 17), the XR device (100c of FIG. 17), the hand-held device (100d of FIG. 17), the home appliance (100e of FIG. 17), the IoT device (100f of FIG. 17), a digital broadcast terminal, a hologram device, a public safety device, an MTC device, a medicine device, a fintech device (or a finance device), a security device, a climate/environment device, the AI server/device (400 of FIG. 17), the BSs (200 of FIG. 17), a network node, etc. The wireless device may be used in a mobile or fixed place based on a use-example/service.

In FIG. 20, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 20 will be described in detail with reference to the drawings.

FIG. 21 shows a hand-held device based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 21, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 20, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

FIG. 22 shows a vehicle or an autonomous vehicle based on an embodiment of the present disclosure. The vehicle or autonomous vehicle may be implemented by a mobile robot, a car, a train, a manned/unmanned Aerial Vehicle (AV), a ship, etc.

Referring to FIG. 22, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 20, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path based on the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method of a first User Equipment (UE) for transmitting a Physical Sidelink Feedback Channel (PSFCH) in a wireless communication system, the method comprising:
    receiving, from a second UE, a first Physical Sidelink Control Channel (PSCCH), wherein a first Sidelink Control Information (SCI) related to the first PSCCH is for scheduling of a first Physical Sidelink Shared Channel (PSSCH);
    receiving, from the second UE, the first PSSCH;
    receiving, from the second UE, a second PSCCH, wherein a second SCI related to the second PSCCH is for scheduling of a second PSSCH;
    transmitting, to the second UE, a first PSFCH providing HARQ-ACK information related to the reception of the first PSSCH; and
    transmitting, to the second UE, a second PSFCH providing conflict information related to a reception of the second PSSCH;
    wherein the second PSFCH is transmitted in a slot that is at least $T_3$ slots before a slot of a reserved resource based on the second SCI,
    wherein the $T_3$ is equal to $T_{proc,1}^{SL}$ determined based on a SubCarrier Spacing (SCS) configuration of a SideLink BandWidth Part (SL BWP), and
    wherein the first PSFCH and the second PSFCH are transmitted in different Physical Resource Blocks (PRBs).

2. The method of claim 1, further comprising: receiving, from a base station, configuration information related to at least one of the first PSFCH or the second PSFCH, via RRC signaling.

3. The method of claim 1, wherein the slot is based on a slot that is at least a number of slots after a slot on which the second SCI is received, and
    wherein the number of slots is determined based on a value of an sl-MinTimeGapPSFCH parameter related to a minimum time gap between the second PSSCH and the second PSFCH.

4. The method of claim 3, wherein the conflict information is based on the second SCI not received later than the number of slots before the slot in which the second PSFCH is transmitted.

5. The method of claim 1, wherein a priority related to a reception of the second PSFCH by the second UE is determined based on a priority related to the reserved resource based on the second SCI.

6. The method of claim 1, wherein the second PSFCH is transmitted based on inability to receive the second PSSCH in the reserved resource based on the second SCI due to half-duplex operation of the first UE, and
    the half-duplex operation of the first UE includes a transmission operation or a reception operation of the first UE.

7. The method of claim 1, wherein the second PSFCH is transmitted based on overlapping of the reserved resource based on the second SCI with a reserved resource based on SCI of a third UE, and
    the third UE is different from the second UE.

8. The method of claim 1,
    wherein the first PSFCH is transmitted in at least one first PRB of the slot and the second PSFCH is transmitted in at least one second PRB of the slot.

9. The method of claim 1, wherein a slot in which the first PSFCH is transmitted is different from the slot in which the second PSFCH is transmitted.

10. A first user equipment (UE) transmitting a Physical Sidelink Feedback Channel (PSFCH) in a wireless communication system, the first UE comprising:
    one or more transceivers;
    one or more processors controlling the one or more transceivers; and
    one or more memories operably connected to the one or more processors,
    wherein the one or more memories store instructions for performing operations based on being executed by the one or more processors,
    wherein the operations include:
    receiving, from a second UE, a first Physical Sidelink Control Channel (PSCCH), wherein a first Sidelink Control Information (SCI) related to the first PSCCH is for scheduling of a first Physical Sidelink Shared Channel (PSSCH);
    receiving, from the second UE, the first PSSCH;
    receiving, from the second UE, a second PSCCH, wherein a second SCI related to the second PSCCH is for scheduling of a second PSSCH;
    transmitting, to the second UE, a first PSFCH providing HARQ-ACK information related to the reception of the first PSSCH; and
    transmitting, to the second UE, a second PSFCH providing conflict information related to a reception of the second PSSCH;
    wherein the second PSFCH is transmitted in a slot that is at least T slots before a slot of a reserved resource based on the second SCI,
    wherein the $T_3$ is equal to $T_{proc,1}^{SL}$ determined based on a SubCarrier Spacing (SCS) configuration of a SideLink BandWidth Part (SL BWP),
    wherein the first PSFCH and the second PSFCH are transmitted in different Physical Resource Blocks (PRBs).

11. A method of a second User Equipment (UE) for receiving a Physical Sidelink Feedback Channel (PSFCH) in a wireless communication system, the method comprising:
- transmitting, to a first UE, a first Physical Sidelink Control Channel (PSCCH), wherein a first Sidelink Control Information (SCI) related to the first PSCCH is for scheduling of a first Physical Sidelink Shared Channel (PSSCH);
- transmitting, to the first UE, the first PSSCH;
- transmitting, to the first UE, a second PSCCH, wherein a second SCI related to the second PSCCH is for scheduling of a second PSSCH;
- receiving, from the first UE, a first PSFCH providing HARQ-ACK information related to a reception of the first PSSCH by the first UE; and
- receiving, from the first UE, a second PSFCH providing conflict information related to a reception of the second PSSCH by the first UE;
- wherein the second PSFCH is received in a slot that is at least $T_3$ slots before a slot of a reserved resource based on the second SCI,
- wherein the $T_3$ is equal to $T_{proc,1}^{SL}$ determined based on a SubCarrier Spacing (SCS) configuration of a Side-Link BandWidth Part (SL BWP),
- wherein the first PSFCH and the second PSFCH are received in different Physical Resource Blocks (PRBs).

* * * * *